US011381775B2

(12) United States Patent
Karafin et al.

(10) Patent No.: US 11,381,775 B2
(45) Date of Patent: *Jul. 5, 2022

(54) LIGHT FIELD DISPLAY SYSTEM FOR VIDEO COMMUNICATION INCLUDING HOLOGRAPHIC CONTENT

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/156,411

(22) Filed: Jan. 22, 2021

(65) Prior Publication Data
US 2021/0218931 A1 Jul. 15, 2021

Related U.S. Application Data

(63) Continuation of application No. 16/351,015, filed on Mar. 12, 2019, now Pat. No. 10,904,479.

(51) Int. Cl.
*G02B 3/00* (2006.01)
*H04N 7/14* (2006.01)
(Continued)

(52) U.S. Cl.
CPC ........... *H04N 7/142* (2013.01); *G03H 1/0005* (2013.01); *H04N 7/157* (2013.01); *H04N 13/161* (2018.05);
(Continued)

(58) Field of Classification Search
CPC .............. G02B 3/0056; G02B 3/0068; H01L 27/14627; H04N 5/2254
See application file for complete search history.

(56) References Cited

U.S. PATENT DOCUMENTS

| 5,187,360 A | 2/1993 | Pasco |
| 5,374,976 A | 12/1994 | Spannenburg |

(Continued)

FOREIGN PATENT DOCUMENTS

| WO | WO 2014/188149 A1 | 11/2014 |
| WO | WO 2016/046514 A1 | 3/2016 |

(Continued)

OTHER PUBLICATIONS

PCT International Search Report and Written Opinion, PCT Application No. PCT/US17/42275, dated Dec. 4, 2017, 21 pages.

(Continued)

*Primary Examiner* — Ram A Mistry
(74) *Attorney, Agent, or Firm* — Charles C. Yang

(57) ABSTRACT

A video communication system uses a light field display to present a holographic image of a remote scene (e.g., a hologram of a remote participant). The system may include a local light field display assembly and a controller. The controller generates display instructions based on visual data corresponding to a remote scene received from a remote image capture system (e.g., a remote light field display system). The display instructions cause the local light field display assembly to generate a holographic image of the remote scene.

23 Claims, 15 Drawing Sheets

(51) Int. Cl.
   *G03H 1/00*    (2006.01)
   *H04N 13/366*  (2018.01)
   *H04N 13/398*  (2018.01)
   *H04N 13/161*  (2018.01)
   *H04N 13/194*  (2018.01)
   *H04N 13/189*  (2018.01)
   *H04N 7/15*    (2006.01)

(52) U.S. Cl.
   CPC ......... *H04N 13/189* (2018.05); *H04N 13/194* (2018.05); *H04N 13/366* (2018.05); *H04N 13/398* (2018.05); *G03H 2001/0061* (2013.01); *G03H 2001/0088* (2013.01)

(56) References Cited

U.S. PATENT DOCUMENTS

| | | | |
|---|---|---|---|
| 5,481,385 | A | 1/1996 | Zimmerman et al. |
| 5,822,125 | A | 10/1998 | Meyers |
| 6,556,280 | B1 | 4/2003 | Kelsey et al. |
| 6,680,761 | B1 | 1/2004 | Greene et al. |
| 7,329,982 | B2 | 2/2008 | Conner et al. |
| 8,442,397 | B2 | 5/2013 | Kang et al. |
| 8,500,284 | B2* | 8/2013 | Rotschild ............... G03H 1/08 353/10 |
| 8,743,466 | B2 | 6/2014 | Yamamoto |
| 8,953,012 | B2 | 2/2015 | Williams et al. |
| 9,179,134 | B2 | 11/2015 | Ranieri et al. |
| 9,507,321 | B2* | 11/2016 | Tsang ................... G03H 1/0808 |
| 10,182,210 | B1 | 1/2019 | Goetzinger, Jr. |
| 2003/0030912 | A1 | 2/2003 | Gleckman et al. |
| 2004/0108806 | A1 | 6/2004 | Cok et al. |
| 2004/0135100 | A1 | 7/2004 | Menon et al. |
| 2005/0243275 | A1 | 11/2005 | Curatu |
| 2005/0260677 | A1 | 11/2005 | Saaski |
| 2006/0191566 | A1 | 8/2006 | Schaafsma |
| 2008/0144174 | A1* | 6/2008 | Lucente ............... H04N 13/307 359/463 |
| 2008/0192313 | A1 | 8/2008 | Matsumura et al. |
| 2009/0037441 | A1 | 2/2009 | Howell et al. |
| 2010/0278480 | A1 | 11/2010 | Vasylyev |
| 2011/0032329 | A1 | 2/2011 | Bauza et al. |
| 2011/0134040 | A1 | 6/2011 | Duparre et al. |
| 2012/0057040 | A1 | 3/2012 | Park et al. |
| 2012/0206726 | A1 | 8/2012 | Pervez et al. |
| 2012/0268950 | A1 | 10/2012 | Parkyn et al. |
| 2012/0300044 | A1 | 11/2012 | Thomas et al. |
| 2013/0027512 | A1 | 1/2013 | Aronsson et al. |
| 2013/0163089 | A1 | 6/2013 | Bohn |
| 2013/0195410 | A1 | 8/2013 | Karbasivalashani et al. |
| 2013/0216123 | A1 | 8/2013 | Shroff et al. |
| 2013/0265485 | A1 | 10/2013 | Kang |
| 2014/0126322 | A1 | 5/2014 | Cipolla et al. |
| 2014/0132694 | A1 | 5/2014 | Shacham et al. |
| 2014/0184731 | A1 | 7/2014 | Bebbington et al. |
| 2014/0267598 | A1* | 9/2014 | Drouin ............... G03H 1/2294 348/40 |
| 2014/0320530 | A1 | 10/2014 | Gruber et al. |
| 2014/0371353 | A1 | 12/2014 | Mitchell et al. |
| 2015/0016777 | A1 | 1/2015 | Abovitz et al. |
| 2015/0178939 | A1 | 6/2015 | Bradski et al. |
| 2015/0219940 | A1 | 8/2015 | Kim et al. |
| 2015/0241608 | A1 | 8/2015 | Shian et al. |
| 2015/0331241 | A1 | 11/2015 | Haddick |
| 2016/0014395 | A1 | 1/2016 | Murray et al. |
| 2016/0037146 | A1 | 2/2016 | McGrew |
| 2016/0070059 | A1 | 3/2016 | Chen et al. |
| 2016/0180511 | A1 | 6/2016 | Zhou et al. |
| 2016/0205394 | A1 | 7/2016 | Meng et al. |
| 2016/0282808 | A1 | 9/2016 | Smalley |

FOREIGN PATENT DOCUMENTS

| | | |
|---|---|---|
| WO | WO 2018/014009 A1 | 1/2018 |
| WO | WO 2018/014010 A1 | 1/2018 |
| WO | WO 2018/014027 A1 | 1/2018 |
| WO | WO 2018/014036 A1 | 1/2018 |
| WO | WO 2018/014040 A1 | 1/2018 |
| WO | WO 2018/014044 A1 | 1/2018 |
| WO | WO 2018/014045 A2 | 1/2018 |
| WO | WO 2018/014046 A1 | 1/2018 |
| WO | WO 2018/014047 A1 | 1/2018 |
| WO | WO 2018/014048 A2 | 1/2018 |
| WO | WO 2018/014049 A1 | 1/2018 |

OTHER PUBLICATIONS

PCT International Search Report and Written Opinion, PCT Application No. PCT/US17/42276, dated Nov. 24, 2017, 14 pages.
PCT International Search Report and Written Opinion, PCT Application No. PCT/US17/42418, dated Dec. 20, 2017, 11 pages.
PCT International Search Report and Written Opinion, PCT Application No. PCT/US17/42452, dated Nov. 17, 2017, ten pages.
PCT International Search Report and Written Opinion, PCT Application No. PCT/US17/42462, dated Oct. 30, 2017, eight pages.
PCT International Search Report and Written Opinion, PCT Application No. PCT/US17/42466, dated Nov. 28, 2017, 12 pages.
PCT International Search Report and Written Opinion, PCT Application No. PCT/US17/42467, dated Dec. 27, 2017, seven pages.
PCT International Search Report and Written Opinion, PCT Application No. PCT/US17/42468, dated Nov. 27, 2017, 11 pages.
PCT International Search Report and Written Opinion, PCT Application No. PCT/US17/42469, dated Oct. 12, 2017, ten pages.
PCT International Search Report and Written Opinion, PCT Application No. PCT/US17/42470, dated Dec. 28, 2017, 18 pages.
PCT International Search Report and Written Opinion, PCT Application No. PCT/US17/42679, dated Nov. 9, 2017, eight pages.
Wetzstein, G. et al., "On Plenoptic Multiplexing and Reconstruction," International Journal on Computer Vistion (IJCV), vol. 101, No. 2, Nov. 5, 2013, pp. 384-400.
International Search Report and Written Opinion of PCT/US2020/015276 dated Mar. 9, 2020.

* cited by examiner

LIGHT FIELD DISPLAY SYSTEM FOR VIDEO COMMUNICATION INCLUDING HOLOGRAPHIC CONTENT

CROSS REFERENCE TO RELATED APPLICATIONS

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates generally to communication systems, and in particular to video communication using light field display systems.

As the availability of communications bandwidth has gone up and the cost of digital cameras has gone down, video has become an increasingly popular method of communication. However, several factors limit the quality of user experience with existing video communication solutions. Typically, the camera and screen are located close together but at noticeably different locations. As a result, participants do not make eye contact and often do not pick up on other gestures and expressions that humans use to add context to the words spoken. Direct interaction is also difficult as the displays on which video is presented act as a barrier between participants. While some existing video communication technology allows documents to be viewed through a screen-sharing function, this results in the video of participants being removed or reduced in size.

SUMMARY

A video communication system uses a light field display to present a holographic image of a remote scene, which may include one or more remote participants. In one embodiment, the system includes a local light field display assembly and a controller. The controller generates display instructions based on visual data corresponding to a remote scene received from a remote image capture system, such as another light field display assembly or a remote light field display system. The display instructions cause the local light field display assembly to generate a holographic image of the remote scene.

DETAILED DESCRIPTION

Figure 1:
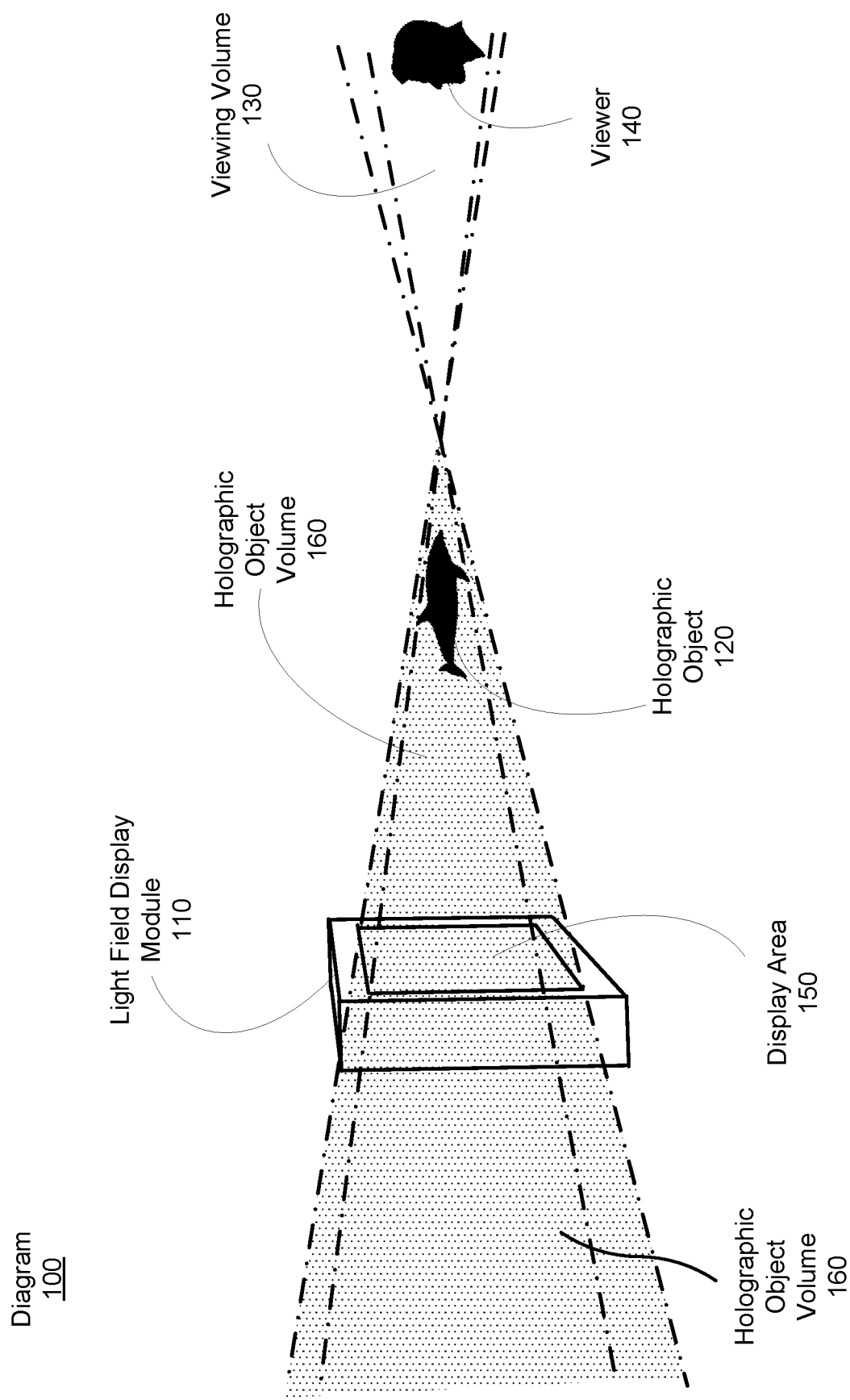
FIG. 1 is a diagram of a light field display module presenting a holographic object, in accordance with one or more embodiments.

A light field (LF) display system provides video communication such as video conferencing, video chat, or pre-recorded video messages. The video communication includes holographic content representing a remote scene, such as holographic images of remote participants, holographic images of props, and holographic whiteboards. Although the terms "video conferencing" and "video chat" are used for convenience to refer to more formal and less formal communication, respectively, any functionality described with reference to one may be provided in the other.

In various embodiments, a holographic image of a participant in one location is presented to a participant in a different location. The holographic image provides a three-dimensional (3D) representation of the participant that can be viewed without the need for glasses, a headset, or other viewing equipment. Where the communication is live, a bidirectional surface that both emits and absorbs light may be used. Thus, there may be a one-to-one correspondence between gaze directions for participants in both locations, enabling the participants to make eye contact as if they were in the same physical space. Furthermore, the presence of a 3D image may aid participants in picking up on gestures and/or expressions that communicate information that might be missed with conventional video communication. Consequently, the use of the LF display system may provide participants with the impression that they are located in the same space, even when separated by thousands of miles.

In some embodiments, additional holographic images may be provided to improve and/or facilitate the communication experience. For example, holographic props such as product prototypes may be provided to further facilitate communication as if the participants were located in the same space. Similarly, a holographic whiteboard may be provided on which participants may draw, and the contents may be synchronized between two or more locations. Because the whiteboard is holographic, it need not be constrained to a two-dimensional (2D) surface. In one embodiment, participants may draw in 3D within an area of space (e.g., a box) designated as a virtual whiteboard. As another example, participants may be able to alter their own appearance and/or the appearance of other participants. This may include partial changes, such as changing clothes, hair color, lighting, or the like as well as complete changes, such as representing the participant with an avatar whose motion is mapped to that of the corresponding participant.

Holographic content presented by the LF display system may also be augmented with other sensory stimuli (e.g., tactile and/or audio). For example, ultrasonic sources in the LF display system may project ultrasonic pressure waves that create a volumetric haptic projection. The volumetric haptic projection provides a tactile surface that corresponds to some or all of the holographic objects that are projected. Holographic content may also include additional visual content (i.e., 2D or 3D visual content). The coordination of energy sources that enables a cohesive experience is part of the LF system in implementations with multiple energy sources (i.e., holographic objects providing the correct haptic feel and sensory stimuli at any given point in time). For example, a LF system may include a controller to coordinate presentation of holographic content and haptic surfaces.

In some embodiments, the LF display system may include elements that enable the system to project at least one type of energy, and, simultaneously, sense at least one type of energy. Sensed energy may be used for recording how a viewer responds to the holographic content. For example, a LF display system can project both holographic objects for viewing as well as ultrasonic waves for haptic perception, and simultaneously record imaging information for tracking of viewers (e.g., video conference participants) and other scene analysis. As an example, such a system may project a holographic product prototype that a participant may manipulate via touch (e.g., by reaching out and rotating the holographic prototype to view it from a different angle), with this interaction with the holographic prototype recorded by the LF display system. The LF display system components that perform energy sensing of the environment may be integrated into the display surface, or they may be dedicated sensors that are separate from the display surface.

Light Field Display System Overview

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell, temperature, etc.). For example, as discussed below, the projection of focused ultrasonic sound waves may generate a mid-air tactile sensation that can simulate a surface of some or all of a holographic object. The LF display system includes one or more LF display modules 110, and is discussed in detail below with regard to FIGS. 2-9.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide layer to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in more detail below with regard to FIGS. 2-3.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the surface of the display area 150 (i.e., towards the viewer 140) such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within a viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small—such that it is designed for a single viewer. In other embodiments, as discussed in detail below with regard to, e.g., FIGS. 4 and 6-9, the LF display modules may be enlarged and/or tiled to create larger holographic object volumes and corresponding viewing volumes that can accommodate a large range of viewers (e.g., one to thousands). The LF display modules presented in this disclosure may be built so that the full surface of the LF display contains holographic imaging optics, with no inactive or dead space, and without any need for bezels. In these embodiments, the LF display modules may be tiled so that the imaging area is continuous across the seam between LF display modules, and the bond line between the tiled modules is virtually undetectable using the visual acuity of the eye. Notably, in some configurations, some portion of the display surface may not include holographic imaging optics, although they are not described in detail herein.

The flexible size and/or shape of a viewing volume 130 allows for viewers to be unconstrained within the viewing volume 130. For example, a viewer 140 can move to a different position within a viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different views of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device, nor be confined to a particular position, in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface. The seamless display surface has an effective display area that is larger than the display areas of the individual LF display modules. Some embodiments relating to tiling LF display modules are discussed below with regard to FIGS. 4, and 6-9. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content in the holographic object volume 160 behind the plane of the display area 150. For example, the LF display module 110 may make the display area 150 appear to be a surface of the ocean that the holographic object 120 is jumping out of. And the displayed content may be such that the viewer 140 is able to look through the displayed surface to see marine life that is under the water. Moreover, the LF display system can generate content that seamlessly moves around the holographic object volume 160, including behind and in front of the plane of the display area 150.

Figure 2A:
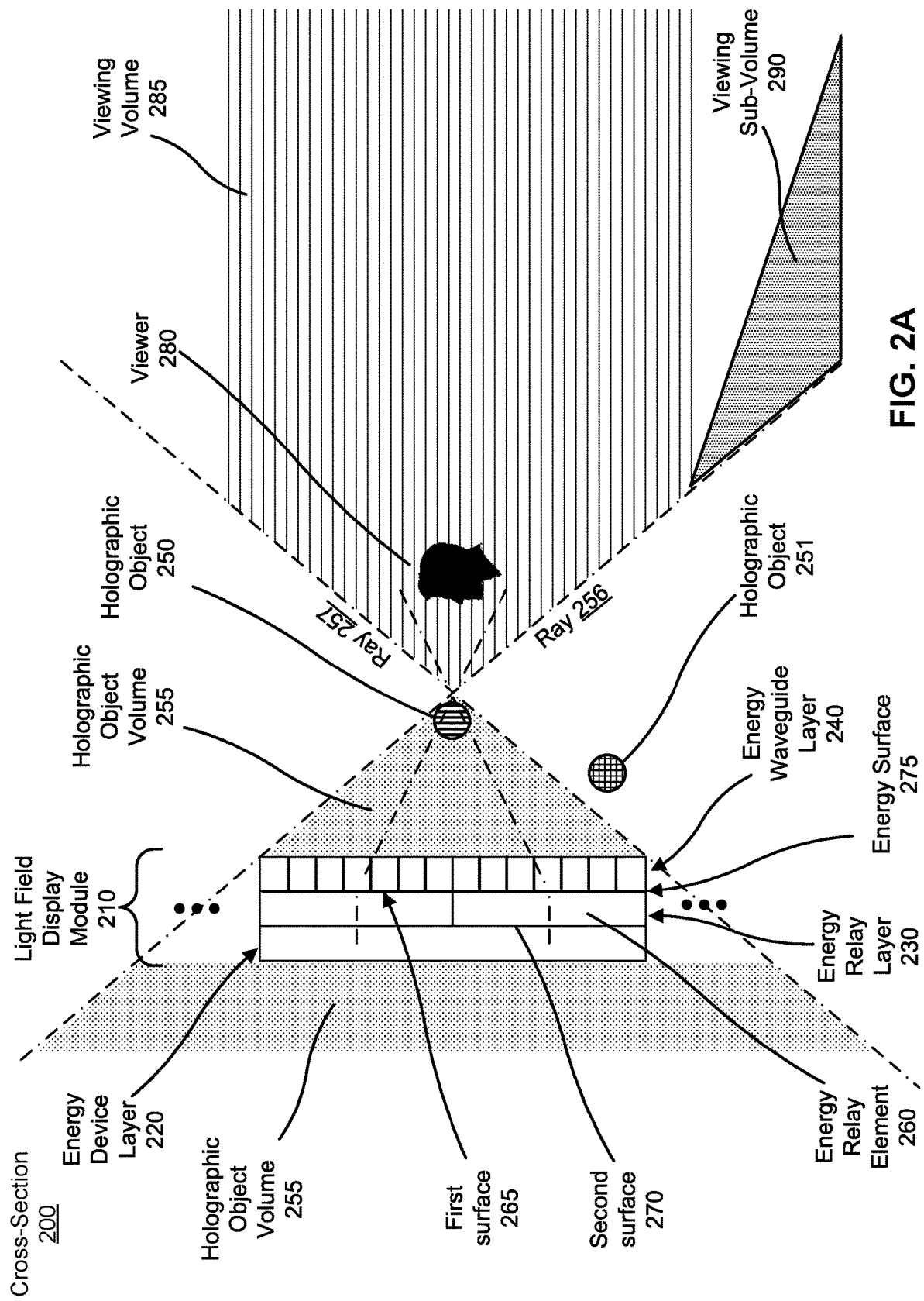
FIG. 2A is a cross section of a portion of a light field display module, in accordance with one or more embodiments.

FIG. 2A illustrates across section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as projection locations for emitted energy. The directed energy from the display surface enables convergence of many rays of energy, which, thereby, can create holographic objects. For visible light, for example, the LF display will project a very large number of light rays from the projection locations that may converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., at a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor may be sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

In some configurations, the energy relay layer 230 relays energy (e.g., electromagnetic energy, mechanical pressure waves, etc.) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having, for example, 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiency relayed between these surfaces without any significant loss in resolution.

The energy waveguide layer 240 directs energy from a location (e.g., a coordinate) on the energy surface 275 into a specific energy propagation path outward from the display surface into the holographic viewing volume 285 using waveguide elements in the energy waveguide layer 240. The energy propagation path is defined by two angular dimensions determined at least by the energy surface coordinate location relative to the waveguide. The waveguide is associated with a spatial 2D coordinate. Together, these four coordinates form a four-dimensional (4D) energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
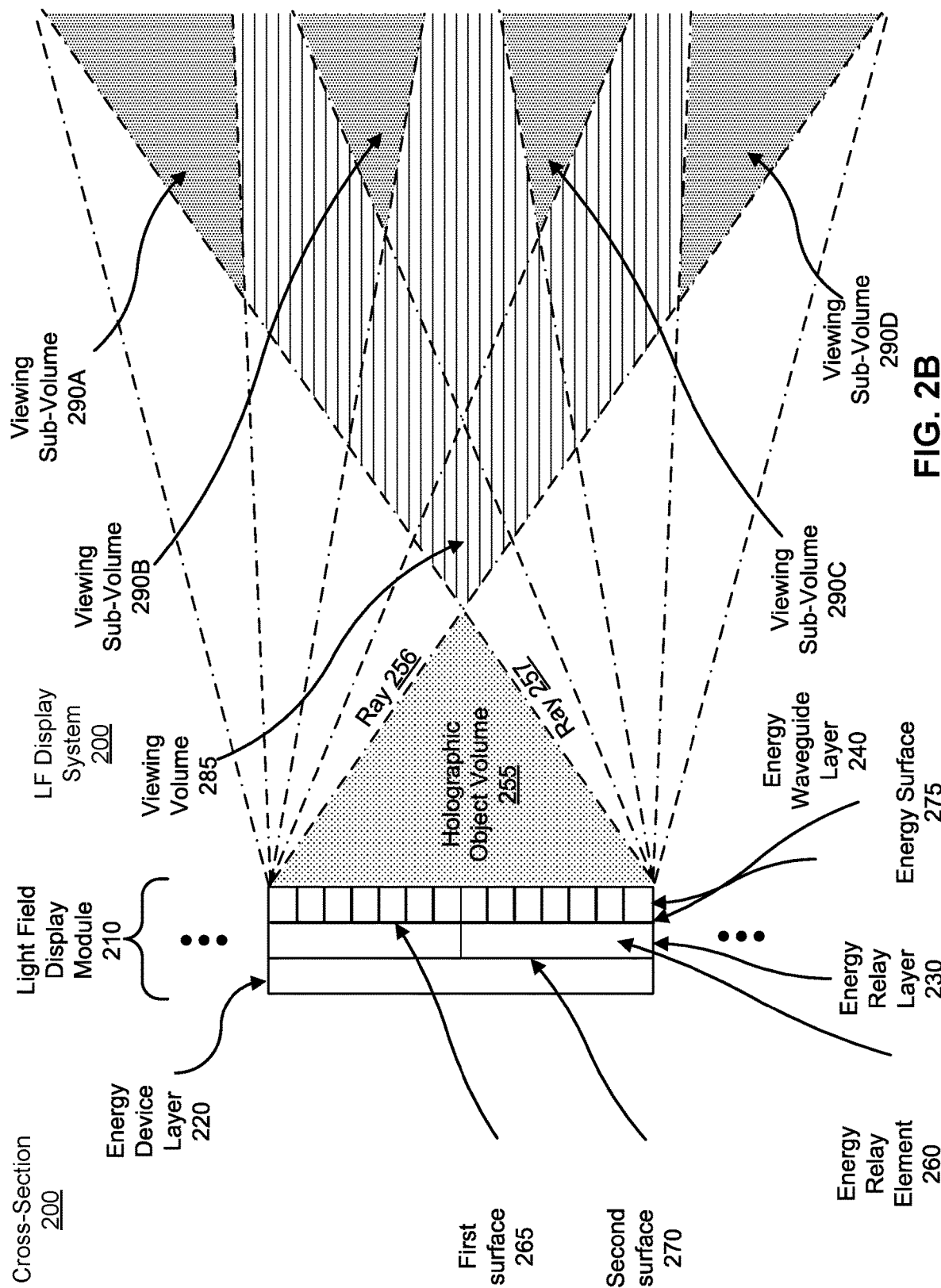
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 may include two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, with no energy relay layer, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
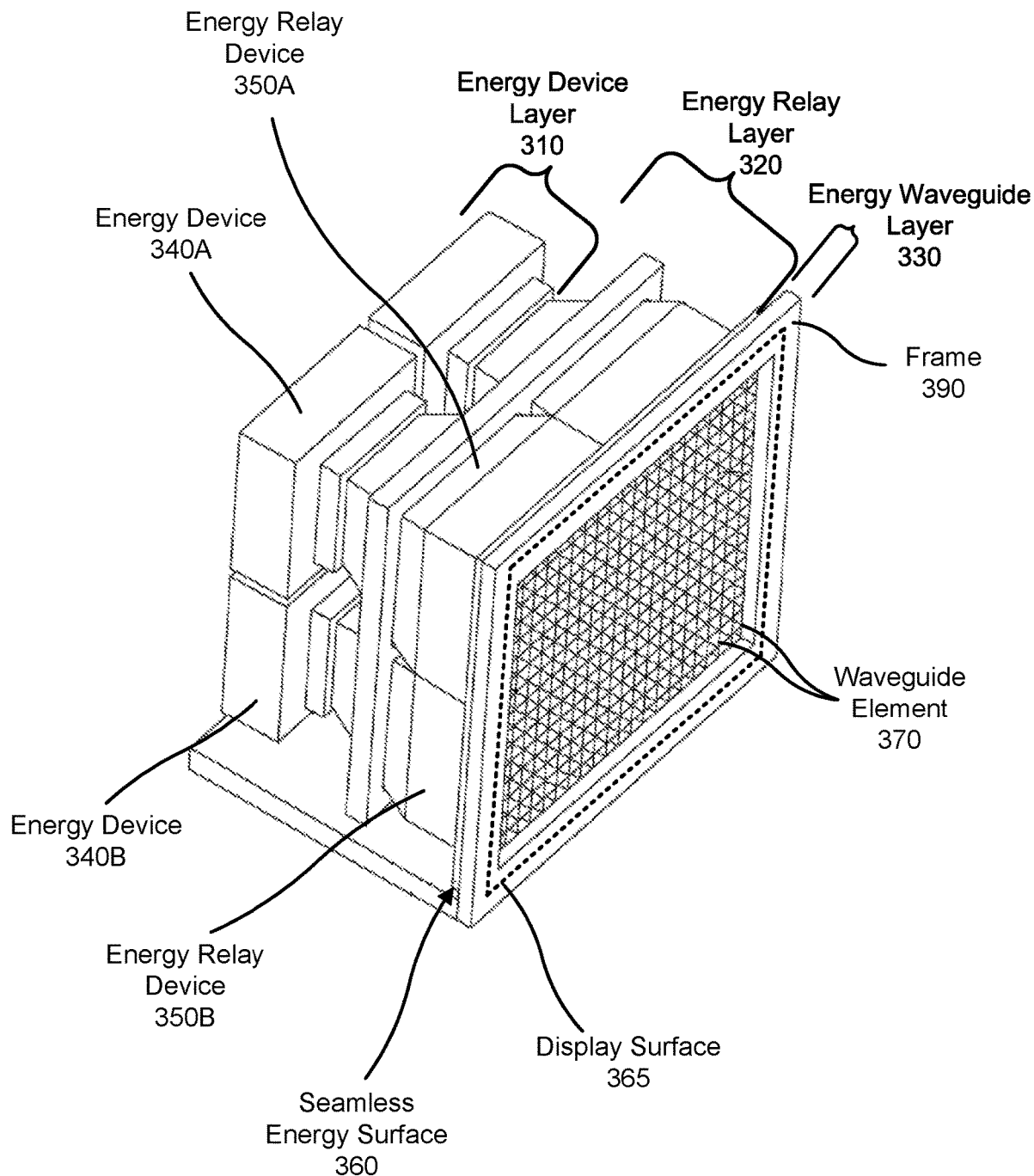
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay devices 350 (three are visible in the figure). The energy relay devices 350 may all relay the same type of energy (e.g., light), or may relay one or more different types (e.g., light and sound). Each of the relay devices 350 includes a first surface and a second surface, the second surface of the energy relay devices 350 being arranged to form a singular seamless energy surface 360. In the illustrated embodiment, each of the energy relay devices 350 is tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of LF display module 300A together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with one or more conductive elements (e.g., planes which sandwich the one or more diaphragm elements). The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between electromagnetic waveguide elements, and/or co-located with structures designed to inhibit light transmission between electromagnetic waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under any particular waveguide element 370 are all energy sources, all energy sensors, or a mix of energy sources and energy sensors.

Figure 3B:
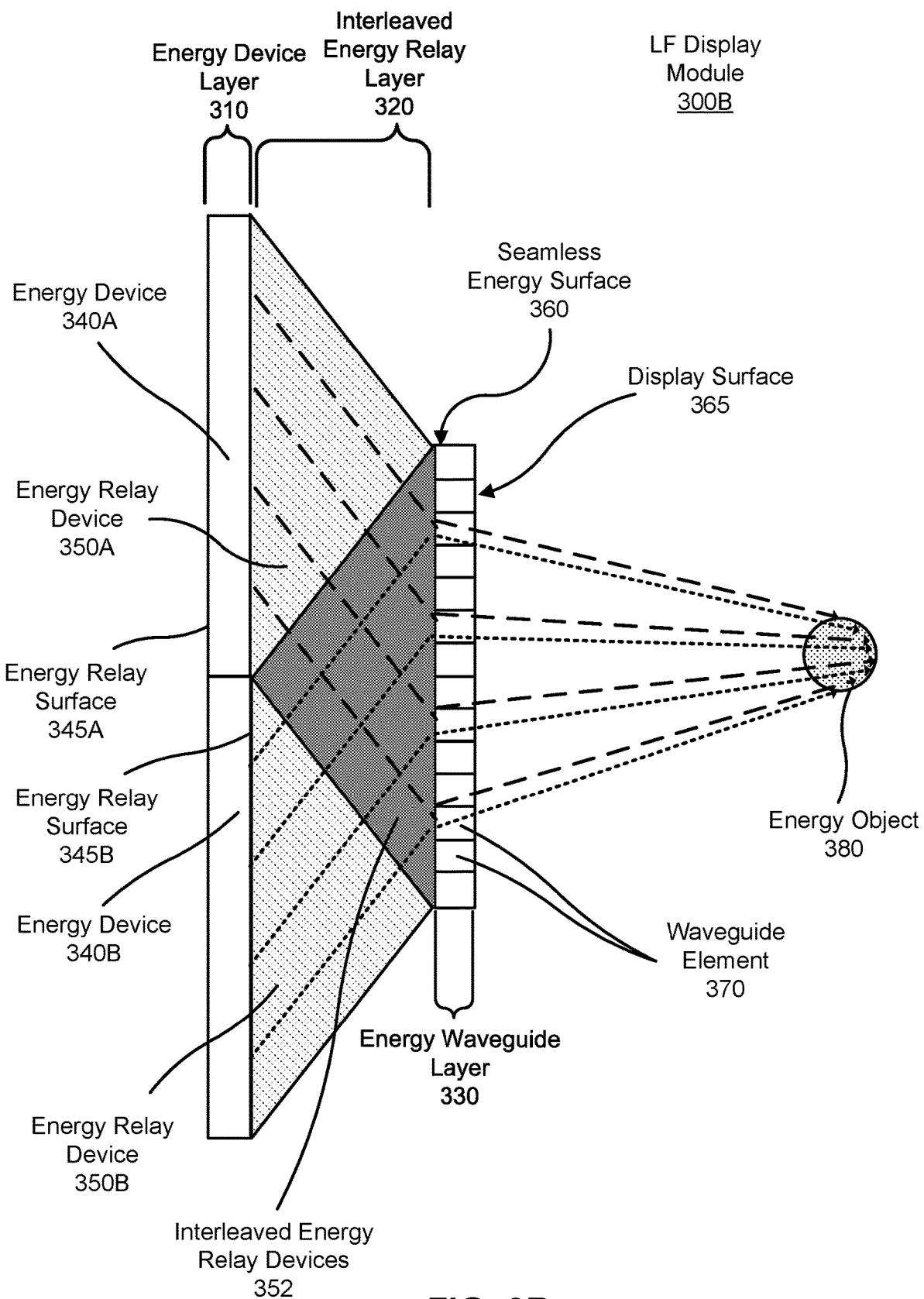
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay 350B transports energy between the energy relay first surface 345B connected to energy device 340B, and the seamless energy surface 360. Both relay devices are interleaved at interleaved energy relay device 352, which is connected to the seamless energy surface 360. In this configuration, surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 300B may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regard to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 300B that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area in FIG. 3B. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side (i.e., the front side) of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source (e.g., energy device 340A) and an imaging sensor is used as an energy sensor (e.g., energy device 340B). In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field from projection locations on the display surface to the front of the display surface and capture a light field from the front of the display surface at the projection locations. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 300B may be configured such that the locations at the seamless energy surface 365 that are under a particular waveguide element 370 are all emissive display locations, all imaging sensor locations, or some combination of these locations. In other embodiments, the bidirectional energy surface can project and receive various other forms of energy.

In another example embodiment of the LF display module 300B, the LF display module is configured to project two different types of energy. For example, in an embodiment, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the LF display module 300B with interleaved energy relay devices may include multiple energy device layers with each energy device layer including a specific type of energy device. In these examples, the energy relay layers are configured to relay the appropriate type of energy between the seamless energy surface 360 and the energy device layer 310.

Tiled LF Display Modules

Figure 4A:
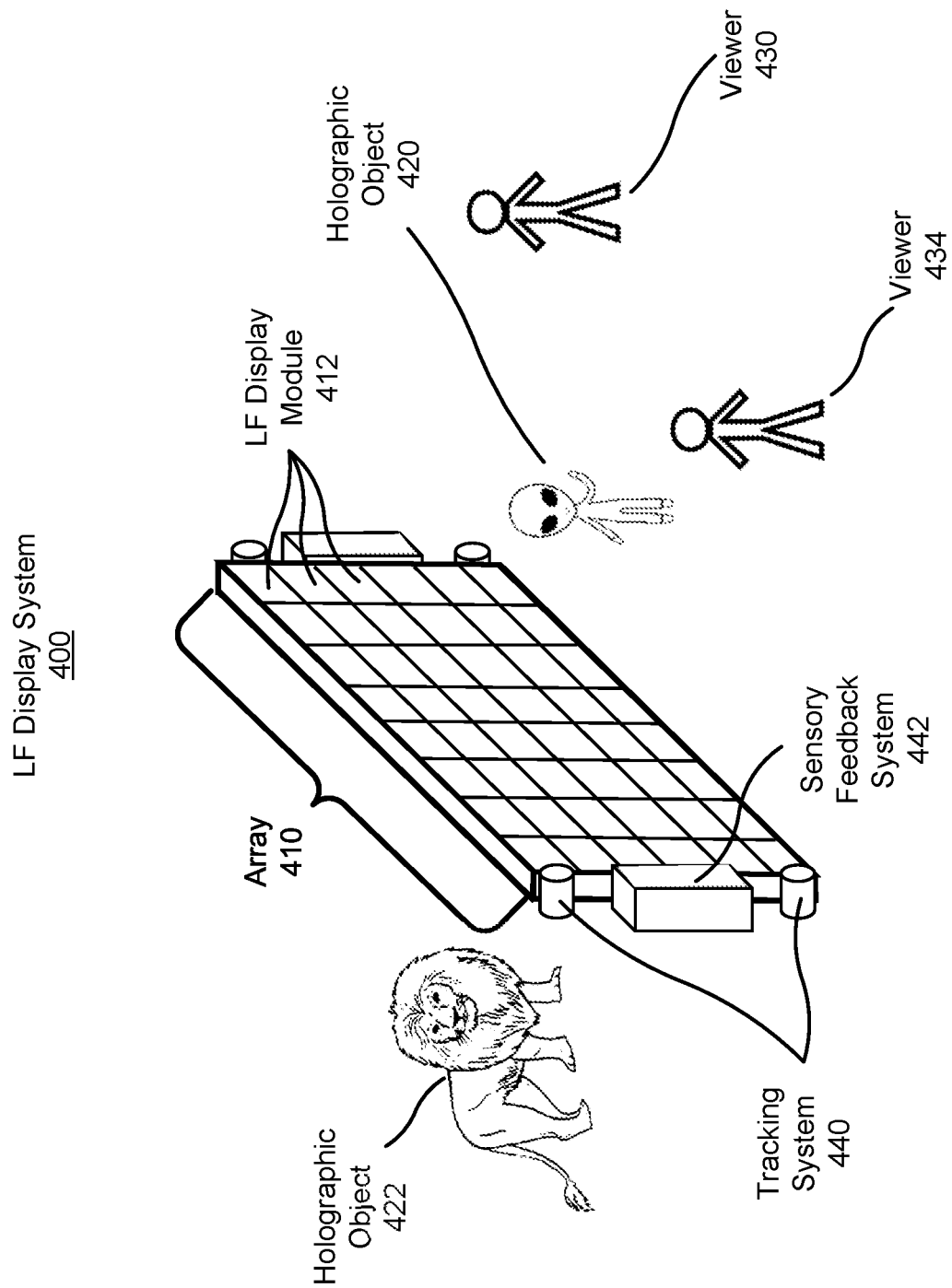
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The LF display module 412 may be the same as LF display module 300A or 300B. The array 410 may cover, for example, some or all of a surface (e.g., a wall) of a room. The LF array may cover other surfaces, such as, for example, a table top, a cubicle divider, etc.

The array 410 may project one or more holographic objects. For example, in the illustrated embodiment, the array 410 projects a holographic object 420 and a holographic object 422. Tiling of the LF display modules 412 allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 420. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 430 and the viewer 434 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in regard to FIG. 5. In other example embodiments, the tracking system may be incorporated into the array 410 as described herein. For example, an energy device (e.g., energy device 340) of one or more LF display modules 412 containing a bidirectional energy surface included in the array 410 may be configured to capture images of viewers in front of the array 410. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions, motions, or gestures of the viewer 430 and/or the viewer 434 as described herein. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. Similarly, the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their position relative to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments the LF display system 400 may include one or more sensory feedback systems. The sensory feedback systems provide other sensory stimuli (e.g., tactile, audio, or smell) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regard to FIG. 5. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system 442 that includes one or more acoustic projection devices external to the array. Alternatively or additionally, the LF display system 400 may include one or more acoustic projection devices integrated into the array 410 as described herein. The acoustic projection devices may consist of an array of ultrasonic sources configured to project a volumetric tactile surface. In some embodiments, the tactile surface may be coincident with a holographic object (e.g., at a surface of the holographic object 420) for one or more surfaces of a holographic object if a portion of a viewer gets within a threshold distance of the one or more surfaces. The volumetric tactile sensation may allow the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 422 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIG. 2. This can limit the amount of perceived immersion that a viewer will experience with a single wall display unit. One way to address this is to use multiple LF display modules that are tiled along multiple sides as described below with respect to FIG. 4B-4F.

Figure 4B:
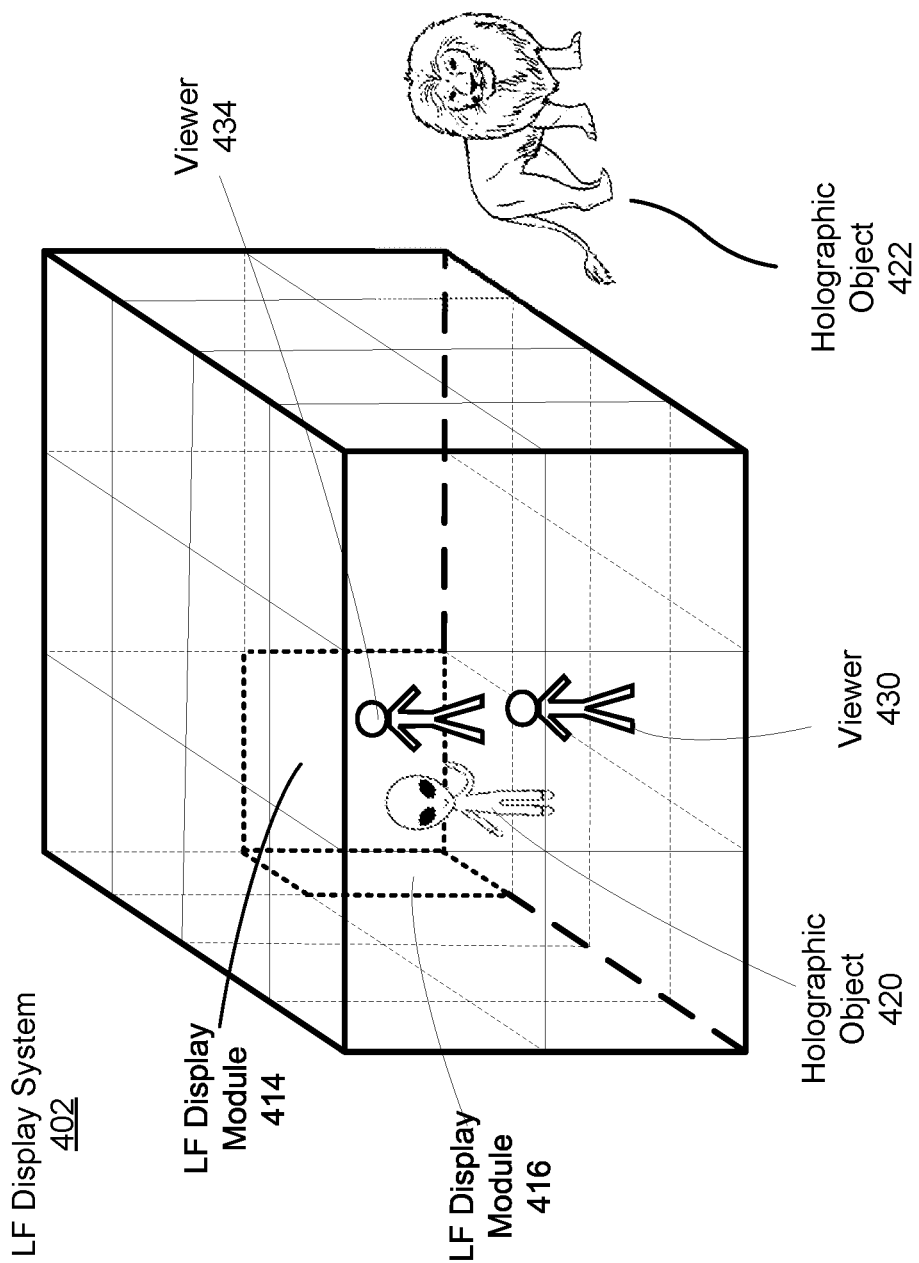
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In FIG. 4B, the plurality of LF display modules cover all the walls, the ceiling, and the floor of a room. In other embodiments, the plurality of LF display modules may cover some, but not all of a wall, a floor, a ceiling, or some combination thereof. In other embodiments, a plurality of LF display modules are tiled to form some other aggregated seamless surface. For example, the walls may be curved such that a cylindrical aggregated energy environment is formed. Moreover, as described below with regard to FIGS. 6-9, in some embodiments, the LF display modules may be tiled to form a surface in a conference room or office (e.g., walls, etc.).

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 434 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420 and be observed by viewer 430. In this manner, occlusion by viewers in the space can cause some portion of the holographic projections to disappear, but the effect is much less than if only one side of the volume was populated with holographic display panels. Holographic object 422 is illustrated "outside" the walls of the six-sided aggregated seamless surface environment because the holographic object volume extends behind the aggregated surface. Thus, the viewer 430 and/or the viewer 434 can perceive the holographic object 422 as "outside" of the enclosed six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface that approximates the walls of a room. In some other examples, an aggregate surface may only occur on a portion of a surface (e.g., half of a wall) rather than a whole surface (e.g., an entire wall). Some examples are described herein.

In some configurations, the aggregate surface of a LF display system may include an aggregate surface configured to project energy towards a localized viewing volume.

Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
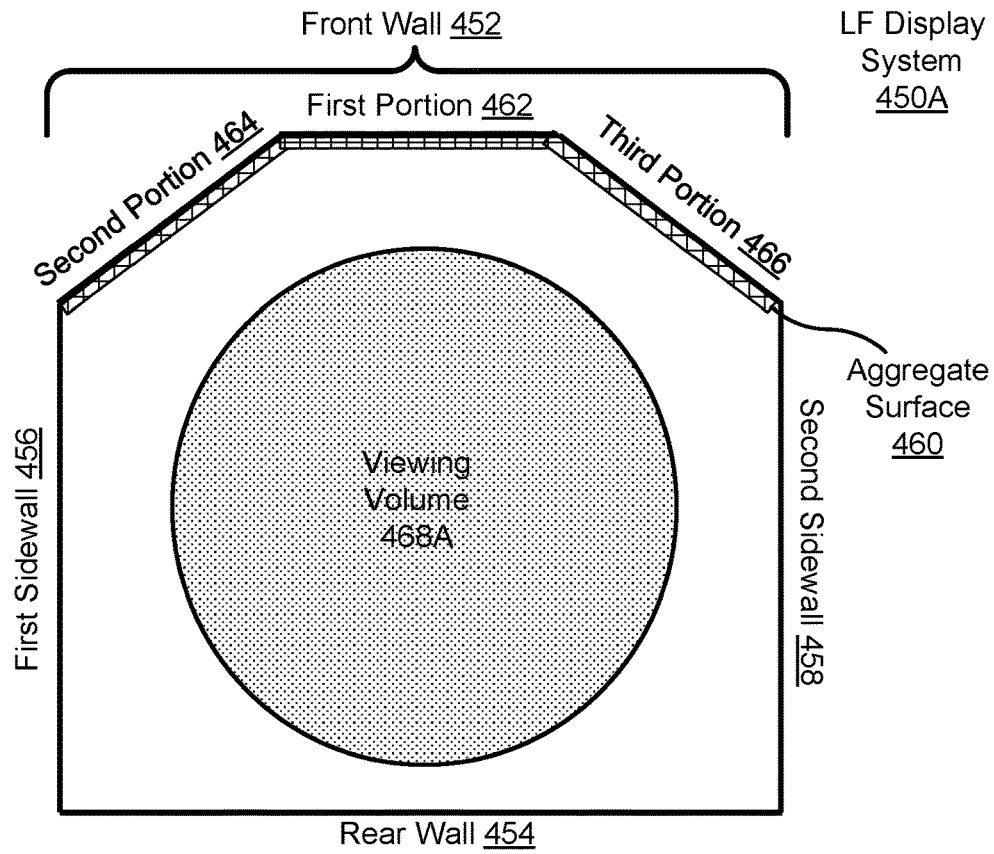
FIG. 4C is a top-down view of a light field display system with an aggregate surface in a winged configuration, in accordance with one or more embodiments.
Figure 4D:
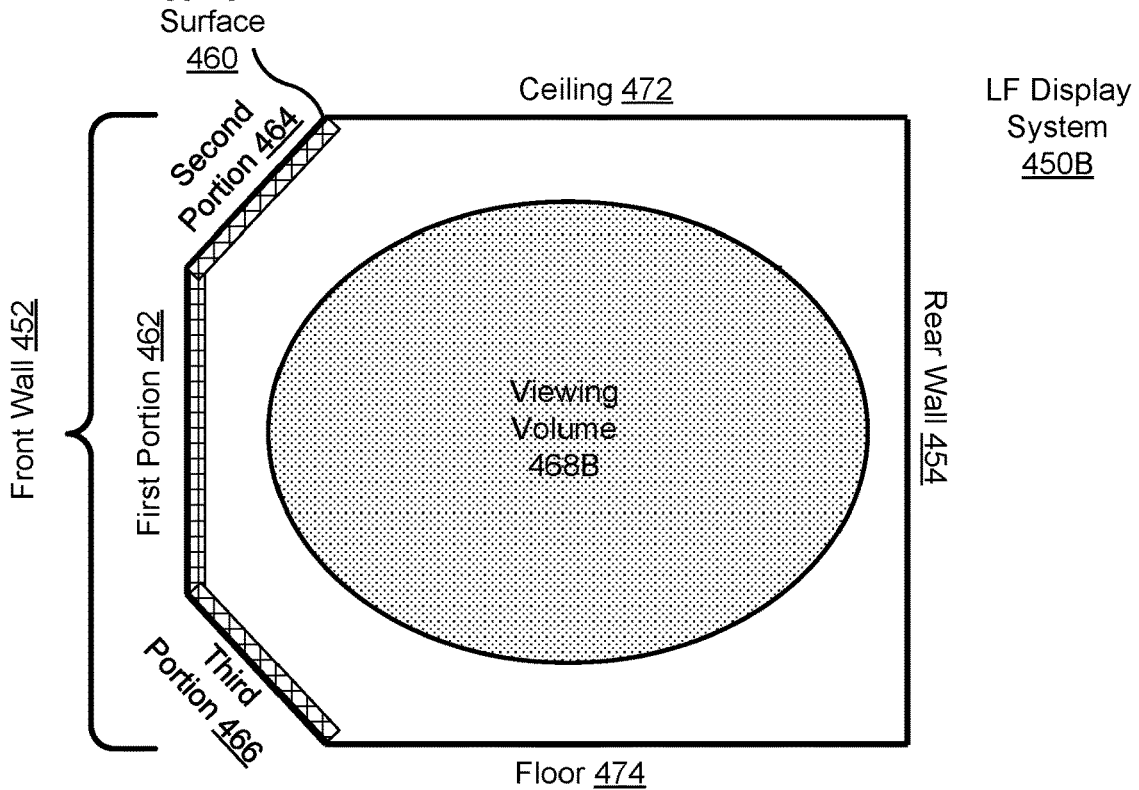
FIG. 4D is a side view of a light field display system with an aggregate surface in a sloped configuration, in accordance with one or more embodiments.

For example, FIG. 4C illustrates top down view of a LF display system 450A with an aggregate surface in a "winged" configuration. In this example, the LF display system 450A is located in a room with a front wall 452, a rear wall 454, a first sidewall 456, a second sidewall 458, a ceiling (not shown), and a floor (not shown). The first sidewall 456, the second sidewall 458, the rear wall 454, floor, and the ceiling are all orthogonal. The LF display system 450A includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the first sidewall 456 and placed at an angle to project energy towards the center of the room (i.e., a first side surface), and (iii) a third portion 466 connecting the first portion 462 to the second sidewall 458 and placed at an angle to project energy towards the center of the room (i.e., a second side surface). The first portion is a vertical plane in the room and has a horizontal and a vertical axis. The second and third portions are angled towards the center of the room along the horizontal axis.

In this example, the viewing volume 468A of the LF display system 450A is in the center of the room and partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers. Additionally, deflection optics may be used to optimize the size and position of the viewing volume for LF display parameters (e.g., dimensions and FOV).

Returning to FIG. 4D, in a similar example, FIG. 4D illustrates a side view of a LF display system 450B with an aggregate surface in a "sloped" configuration. In this example, the LF display system 450B is located in a room with a front wall 452, a rear wall 454, a first sidewall (not shown), a second sidewall (not shown), a ceiling 472, and a floor 474. The first sidewall, the second sidewall, the rear wall 454, floor 474, and the ceiling 472 are all orthogonal. The LF display system 450B includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the ceiling 472 and angled to project energy towards the center of the room (i.e., a first side surface), and (iii) a third portion 464 connecting the first portion 462 to the floor 474 and angled to project energy towards the center of the room (i.e., a second side surface). The first portion is a vertical plane in the room and has a horizontal and a vertical axis. The second and third portions are angled towards the center of the room along the vertical axis.

In this example, the viewing volume 468B of the LF display system 4508 is in the center of the room and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 4688.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front wall were used.

Additionally, the configuration of the LF display system and the environment which it is located may inform the shape and locations of the viewing volumes and viewing sub-volumes.

Figure 4E:
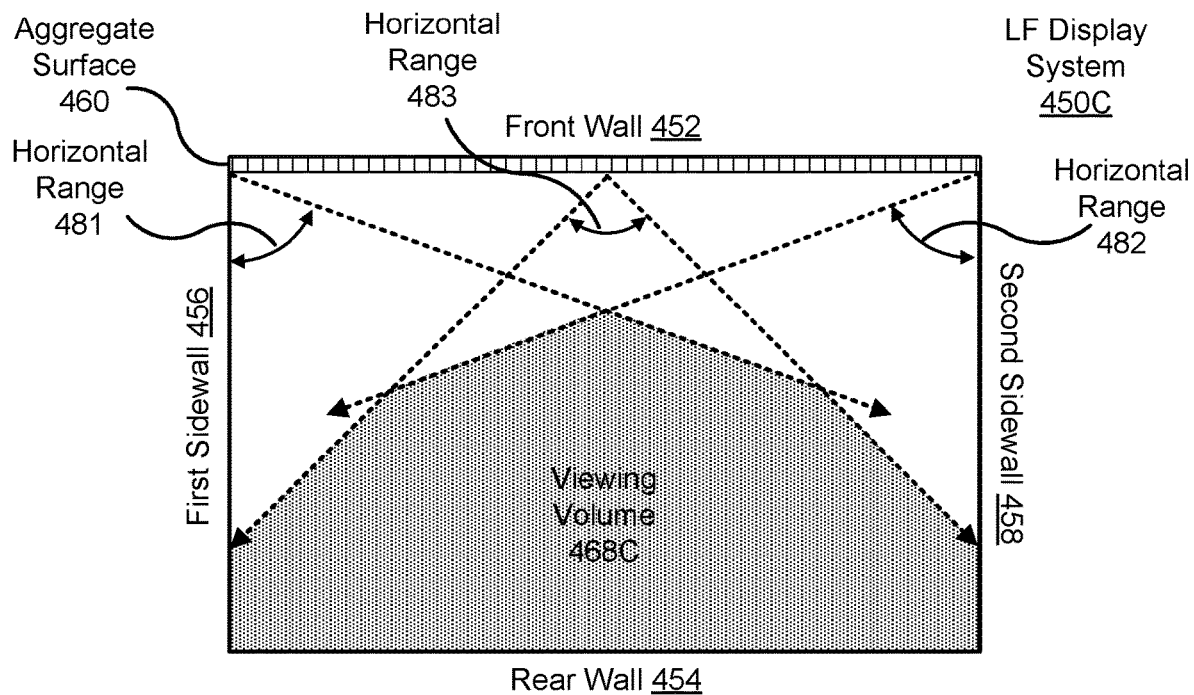
FIG. 4E is a top-down view of a light field display system with an aggregate surface on a front wall of a room, in accordance with one or more embodiments.

FIG. 4E, for example, illustrates a top down view of a LF display system 450C with an aggregate surface 460 on a front wall 452 of a room. In this example, the LF display system 450D is located in a room with a front wall 452, a rear wall 454, a first sidewall 456, a second sidewall 458, a ceiling (not shown), and a floor (not shown).

LF display system 450C projects various rays from the aggregate surface 460. From each position on the display surface, light rays are projected in an angular range that is centered on the viewing volume. The rays projected from the left side of the aggregate surface 460 have horizontal angular range 481, rays projected from the right side of the aggregate surface have horizontal angular range 482, and rays projected from the center of the aggregate surface 460 have horizontal angular range 483. In between these points, the projected rays may take on intermediate values of angle ranges. Having a gradient deflection angle in the projected rays across the display surface in this manner creates a viewing volume 468C. Further, this configuration avoids wasting resolution of the display on projecting rays into the side walls 456 and 458.

Figure 4F:
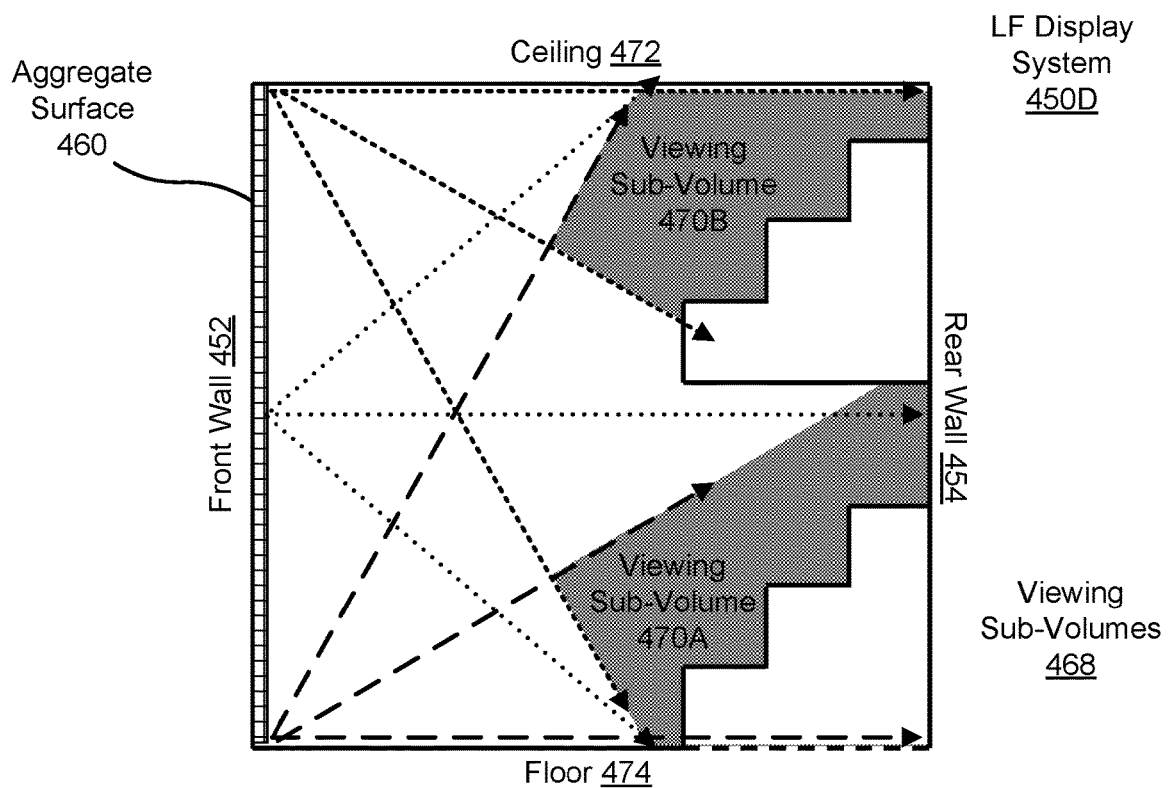
FIG. 4F is a side view of a side view of a light field display system with an aggregate surface on the front wall of the room, in accordance with one or more embodiments.

FIG. 4F illustrates a side view of a LF display system 450D with an aggregate surface 460 on a front wall 452 of a room. In this example, the LF display system 450E is located in a room with a front wall 452, a rear wall 454, a first sidewall (not shown), a second sidewall (not shown), a ceiling 472, and a floor 474. In this example, the floor is tiered such that each tier rises in steps moving from the front wall to the back wall. Here, each tier of the floor includes a viewing sub-volume (e.g., viewing sub volume 470A and 470B). A tiered floor allows for viewing sub-volumes that do not overlap. That is, each viewing sub-volume has a line of sight from the viewing sub-volume to the aggregate surface 460 that does not pass through another viewing sub-volume. In other words, this orientation produces a "stadium seating" effect in which the vertical offset between tiers allows each tier to "see over" the viewing sub-volumes of other tiers. LF display systems including viewing sub-volumes that do not overlap may provide a higher quality viewing experience than LF display systems that have viewing volumes that do overlap. For example, in the configuration shown in FIG. 4F, different holographic content may be projected to the audiences in viewing sub-volumes 470A and 470B.

Control of a LF Display System

Figure 5:
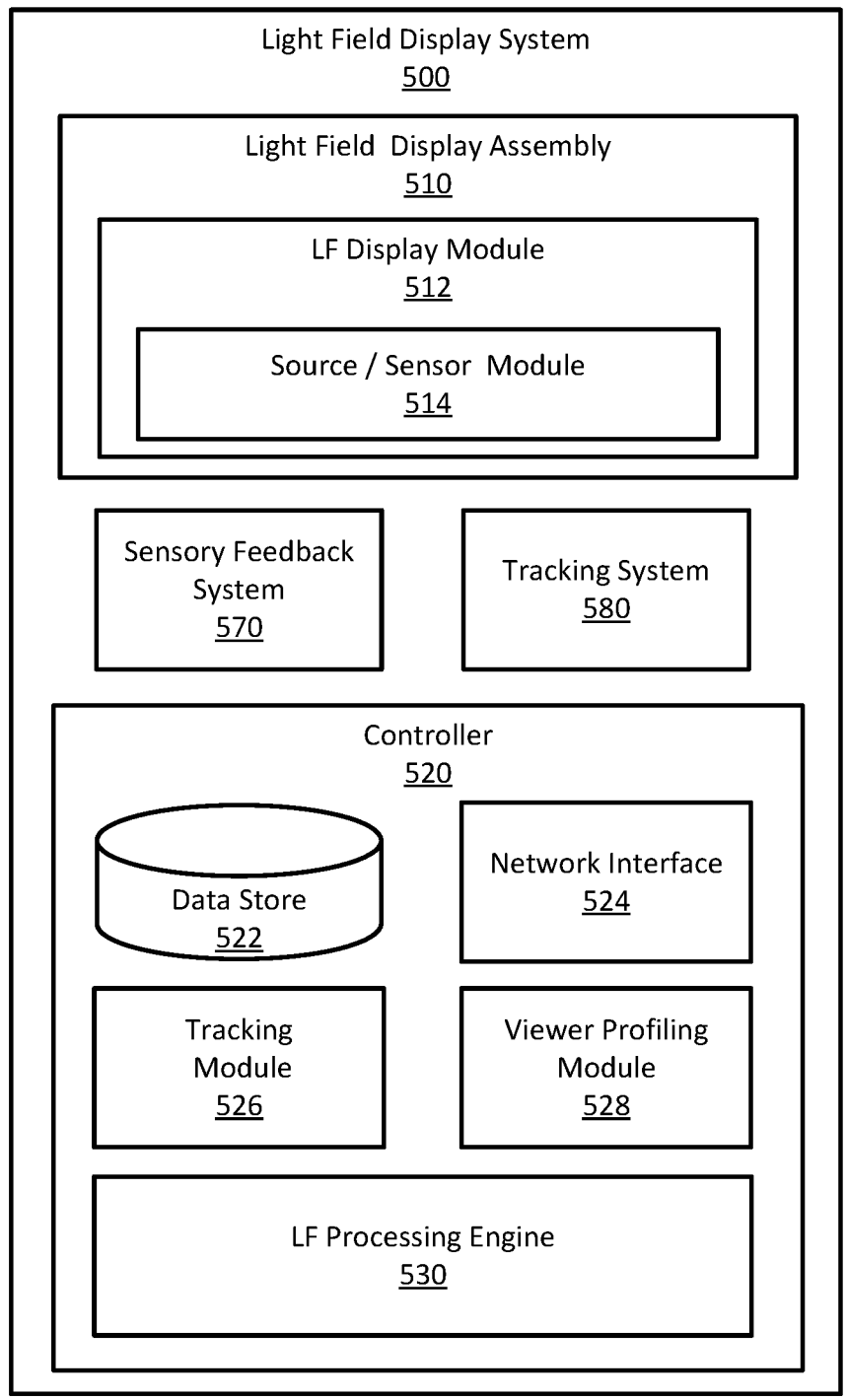
FIG. 5 is a block diagram of a light field display system, in accordance with one or more embodiments.

FIG. 5 is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a datastore 522, a network interface 524, and a LF processing engine 530. The controller 520 may also include a tracking module 526, and a viewer profiling module 528. In some embodiments, the LF display system 500 also includes a sensory feedback system 570 and a tracking system 580. The LF display systems described in the context of FIGS. 1-4 are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-9.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface the LF display assembly 510, behind the aggregate surface of the LF display assembly 510, or some combination thereof. Generating display instructions with the controller 520 is described in more detail below.

The LF display assembly 510 provides holographic content (e.g., images of participants, avatars of participants, holographic objects, and/or other sensory content) using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a wall of a cinema, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, or smell) using a sensory feedback system 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, transducers, etc. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not.

To illustrate, in an example embodiment of a light field display system 500, a sensory feedback system 570 may include one or more acoustic projection devices. The one or more acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the target area when executing display instructions received from the controller. The aroma devices may be tied into an air circulation system (e.g., ducting, fans, or vents) to coordinate air flow within the target area. Further, the sensory feedback system 570 may include a temperature adjustment device. The temperature adjustment device is configured to increase or decrease temperature in some, or all, of the target area when executing display instructions received from the controller 520.

In some embodiments, the sensory feedback system 570 is configured to receive input from viewers of the LF display system 500. In this case, the sensory feedback system 570 includes various sensory feedback devices for receiving input from viewers. The sensor feedback devices may include devices such as acoustic receiving devices (e.g., a microphone), pressure sensors, joysticks, motion detectors, transducers, etc. The sensory feedback system may transmit the detected input to the controller 520 to coordinate generating holographic content and/or sensory feedback.

To illustrate, in an example embodiment of a light field display assembly 510, a sensory feedback system 570 includes a microphone. The microphone is configured to record audio produced by one or more viewers (e.g., participants in a video conference). The sensory feedback system 570 provides the recorded audio to the controller 520 as viewer input. The controller 520 may use the viewer input to generate holographic content. For example, if a participant mentions a particular product, a holographic representation of the product may be generated to provide context for the participant's comments. Similarly, the sensory feedback system 570 may include a pressure sensor. The pressure sensor is configured to measure forces applied by viewers to the pressure sensor. The sensory feedback system 570 may provide the measured forces to the controller 520 as viewer input.

In some embodiments, the LF display system 500 includes a tracking system 580. The tracking system 580 includes any number of tracking devices configured to determine the position, movement and/or characteristics of viewers in the target area. Generally, the tracking devices are external to the LF display assembly 510. Some example tracking devices include a camera assembly ("camera"), a depth sensor, structured light, a LIDAR system, a card scanning system, or any other tracking device that can track viewers within a target area.

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameter when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display source/sensor module 514 included in the LF display assembly 510. For example, as previously described, if the energy relay element of alight field module 512 is a bidirectional energy layer which interleaves both emissive displays and imaging sensors at the energy device layer 220, the LE display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 580 may adjust one or more imaging parameters when executing tracking instructions received from the controller 520. An imaging parameter is a parameter that affects how the camera captures images. An imaging parameter may include, e.g., frame rate, aperture, gain, exposure length, frame timing, rolling shutter or global shutter capture modes, some other parameter that affects how the camera captures images, or some combination thereof.

The controller 520 controls the LF display assembly 510 and any other components of the LF display system 500. The controller 520 comprises a data store 522, a network interface 524, a tracking module 526, a viewer profiling module 528, and a light field processing engine 530. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, a virtual model of a target area, tracking information, images captured by the camera, one or more viewer profiles, calibration data for the light field display assembly 510, configuration data for the LF display system 510 including resolution and orientation of LF modules 512, desired viewing volume geometry, content for graphics creation including 3D models, scenes and environments, materials and textures, other information that may be used by the LF display system 500, or some combination thereof. The data store 522 is a memory, such as a read only memory (ROM), dynamic random access memory (DRAM), static random access memory (SRAM), or some combination thereof.

The network interface 524 allows the light field display system to communicate with other systems or environments via a network. In one example, the LF display system 500 receives holographic content from a remote light field display system via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526.

The tracking module 526 may determine a position of one or more viewers within the target area (e.g., sitting in a particular chair in a conference room, walking around the conference room, etc.). The determined position may be relative to, e.g., some reference point (e.g., a display surface, a conference table, etc.). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track viewers. In other embodiments, the tracking module 526 actively tracks viewers. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500. The tracking information may include body movements that correspond to various input options that the viewer is provided by the LF display system 500. For example, the tracking module 526 may track a viewer's body movement and assign any various movement as an input to the LF processing engine 530. The tracking module 526 may provide the tracking information to the data store 522, the LF processing engine 530, the viewer profiling module 528, any other component of the LF display system 500, or some combination thereof.

To provide context for the tracking module 526, consider an example embodiment of an LF display system 500 provides video conferencing for a meeting. In response to one participant calling a vote on a proposal, one or more participants raise their hands. The tracking system 580 may record the movement of the participants' hands and transmit the recording to the tracking module 526. The tracking module 526 tracks the motion of the participants' hands in the recording and sends the input to LF processing engine 530. The viewer profiling module 528, as described below, determines whether information in the image indicates that motion of the participants' hands is associated with a vote in favor of the proposal. The LF processing engine 530 may generate appropriate holographic content indicating the result of the vote. For example, the LF processing engine 530 may project a tally of the votes.

The LF display system 500 includes a viewer profiling module 528 configured to identify and profile viewers. The viewer profiling module 528 generates a profile of a viewer (or viewers) that views holographic content displayed by a LF display system 500. The viewer profiling module 528 generates a viewer profile based, in part, on viewer input and monitored viewer behavior, actions, and reactions. The viewer profiling module 528 can access information obtained from tracking system 580 (e.g., recorded images, videos, sound, etc.) and process that information to determine various information. In various examples, viewer profiling module 528 can use any number of machine vision or machine hearing algorithms to determine viewer behavior, actions, and reactions. Monitored viewer behavior can include, for example, smiles, raising a hand, cheering, clapping, laughing, and/or other changes in gestures, or movement by the viewers, etc.

More generally, a viewer profile may include any information received and/or determined about a viewer viewing holographic content from the LF display system. For example, each viewer profile may log actions or responses of that viewer to the content displayed by the LF display system 500. Some example information that can be included in a viewer profile are provided below.

In some embodiments, a viewer profile can indicate a role of the viewer in relation to an organization or group associated with the LF display system 500. For example, in a video conferencing system operated by a business, a viewer profile might include, for example, the viewer's job title, responsibilities, authorization to view confidential information, etc. A viewer profile may additionally or alternatively indicate more general viewer characteristics such as, for example, age, sex, ethnicity, clothing, location, etc.

In some embodiments, a viewer profile can indicate viewer preferences regarding the presentation of holographic content. For example, a viewer profile may indicate holographic object volumes to display holographic content (e.g., to the viewer's right) and/or holographic object volumes to not display holographic content (e.g., to the viewer's left). The viewer profile may also indicate that the viewer prefers to have haptic interfaces presented near them, or prefers to avoid them.

In some embodiments, a viewer profile may also describe characteristics and preferences for a group of viewers rather than a particular viewer. For example, viewer profiling module 528 may generate a viewer profile for particular combinations of viewers in a video conference. In one example, viewer profiling module 528 creates a profile for a pair of viewers indicating that, when the pair engage in a video conference session using a LF display system 500, they prefer a particular configuration of holographic viewing zones, haptic interfaces, background images, and/or avatars, etc. Any of the previously described information and characteristics may be applied to a group of viewers.

The viewer profiling module 528 may also access a profile associated with a particular viewer (or viewers) from a third-party system or systems to build a viewer profile. For example, a viewer may connect one or more social media accounts to the viewer's profile maintained by the viewer profiling module 528. The viewer profiling module 528 may access information from one or more of the social media accounts to build (or augment) the viewer's profile.

In some embodiments, the data store 522 includes a viewer profile store that stores viewer profiles generated, updated, and/or maintained by the viewer profiling module 528. The viewer profile can be updated in the data store at any time by the viewer profiling module 528. For example, in an embodiment, the viewer profile store receives and stores information regarding a particular viewer in their viewer profile when the particular viewer views holographic content provided by the LF display system 500. In this example, the viewer profiling module 528 includes a facial recognition algorithm that may recognize viewers and positively identify them as they view presented holographic content. To illustrate, as a viewer enters the target area of the LF display system 500, the tracking system 580 obtains an image of the viewer. The viewer profiling module 528 inputs the captured image and identifies the viewer's face using the facial recognition algorithm. The identified face is associated with a viewer profile in the profile store and, as such, all input information obtained about that viewer may be stored in their profile. The viewer profiling module 528 may also utilize card identification scanners, voice identifiers, a radio-frequency identification (RFID) chip scanners, barcode scanners, etc. to positively identify a viewer.

In embodiments where the viewer profiling module 528 can positively identify viewers, the viewer profiling module 528 can determine each visit of each viewer to the LF display system 500. The viewer profiling module 528 may then store the time and date of each visit in the viewer profile for each viewer. Similarly, the viewer profiling module 528 may store received inputs from a viewer from any combination of the sensory feedback system 570, the tracking system 580, and/or the LF display assembly 510 each time they occur. The viewer profile system 528 may additionally receive further information about a viewer from other modules or components of the controller 520 which can then be stored with the viewer profile. Other components of the controller 520 may then also access the stored viewer profiles for determining subsequent content to be provided to that viewer.

The LF processing engine 530 generates holographic content comprised of light field data, as well as data for all of the sensory domains supported by a LF display system 500. For example, LF processing engine 530 may generate 4D coordinates in a rasterized format ("rasterized data") that, when executed by the LF display assembly 510, cause the LF display assembly 510 to present holographic content. The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4D coordinates and sensory data represent holographic data as display instructions executable by a LF display system to generate holographic and sensory content. More generally, holographic content can take the form of computer graphics (CG) content with ideal light field coordinates, live action content, rasterized data, vectorized data, electromagnetic energy transported by a set of relays, instructions sent to a group of energy devices, energy locations on one or more energy surfaces, the set of energy propagation paths that are projected from the display surface, a holographic object that is visible to a viewer or an audience, and many other similar forms.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short film for holographic projection by a LF display system 500. In this example, the LF display system 500 includes a display containing several gigapixels and the rasterized data contains information for each pixel location on the display. The corresponding size of the rasterized data is vast (e.g., many gigabytes per second of film display time), and unmanageable for efficient transfer over commercial networks via a network interface 524. The efficient transfer problem may be amplified for applications including live streaming of holographic content. An additional problem with merely storing rasterized data on data store 522 arises when an interactive experience is desired using inputs from the sensory feedback system 570 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In summary, the LF processing engine 530 may generate holographic content derived from rasterized data accessed from the data store 522, vectorized data accessed from the data store 522, or vectorized data received via the network interface 524. In various configurations, vectorized data may be encoded before data transmission and decoded after reception by the LF controller 520. In some examples, the vectorized data is encoded for added data security and performance improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors.

Vectorized data contains all the information for each of the sensory domains supported by a LF display system 500 in a way that may support an interactive experience. For example, vectorized data for an interactive holographic experience may include any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data using the LF display assembly 510. In various configurations, the vectorized properties may include one or more red/green/blue/alpha channel (RGBA)+depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 may also generate an interactive viewing experience. That is, holographic content may be responsive to input stimuli containing information about viewer locations, gestures, interactions, interactions with holographic content, or other information derived from the viewer profiling module 528, and/or tracking module 526. For example, in an embodiment, a LF processing system 500 creates an interactive viewing experience using vectorized data of a real-time performance received via a network interface 524. In another example, if a holographic object needs to move in a certain direction immediately in response to a viewer interaction, the LF processing engine 530 may update the render of the scene so the holographic object moves in that required direction. This may require the LF processing engine 530 to use a vectorized data set to render light fields in real time based a 3D graphical scene with the proper object placement and movement, collision detection, occlusion, color, shading, lighting, etc., correctly responding to the viewer interaction. The LF processing engine 530 converts the vectorized data into rasterized data for presentation by the LF display assembly 510.

The rasterized data includes holographic content instructions and sensory instructions (display instructions) representing the real-time performance. The LF display assembly 510 simultaneously projects holographic and sensory content of the real-time performance by executing the display instructions. The LF display system 500 monitors viewer interactions (e.g., vocal response, touching, etc.) with the presented real-time performance with the tracking module 526 and viewer profiling module 528. In response to the viewer interactions, the LF processing engine may create an interactive experience by generating additional holographic and/or sensory content for display to the viewers.

To illustrate, consider an example embodiment of an LF display system 500 including a LF processing engine 530 that generates a holographic object representing a product prototype. A viewer may move to touch the holographic object representing product prototype. Correspondingly, the tracking system 580 tracks movement of the viewer's hands relative to the holographic object. The movement of the viewer is recorded by the tracking system 580 and sent to the controller 520. The tracking module 526 continuously determines the motion of the viewer's hand and sends the determined motions to the LF processing engine 530. The LF processing engine 530 determines the placement of the viewer's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the viewer is given both a visual and tactile perception of touching the prototype. More simply, when a viewer views his hand touching a holographic prototype, the viewer simultaneously feels haptic feedback indicating their hand touches the holographic prototype, and the prototype changes position or motion in response to the touch. In some examples, rather than presenting an interactive prototype accessed from a data store 522, the interactive prototype may be received as part of holographic content received from a live-streaming application via a network interface 524 (e.g., the holographic prototype may be a holographic representation of a physical prototype at a different physical location that is being imaged by a different LF display system 500.

In embodiments where the LF display system is used to provide video conferencing, the holographic content may include holographic images of one or more participants in the video conference. The holographic content may also include other holographic objects such as, for example, holographic handouts, holographic whiteboards, holographic movies or videos, holographic simulations, holographic product prototypes, holographic models, holographic experiences, holographic games, holographic items, holographic assistants, any other holographic object, or any combination thereof. In some embodiments, holographic content may be received from third party systems separate from the LF display system 500.

In a video conferencing configuration, the participants are located in two or more physical locations. At least one of the physical locations has a LF capture system. The LF capture system can be a plenoptic light field camera, or a multiview camera system with multiple lenses and sensors, external to the LF display. Alternatively, the LF capture system can be integrated into the LF display assembly 510, as a bidirectional energy surface which both projects LF as well as absorbs incident light, and relays the incident light to imaging sensors.

The data set generated in capturing the full LF may be unmanageable for most processors as well as efficient network transmission. To address this, the data recorded from the light field capture system may be compressed. In some embodiments, the data is reduced into a vectorized format including, for example, any of: N red/green/blue/alpha channel (RGBA)+depth images, N multi view images with or without depth at varying resolutions that may include one high-resolution center image and other views at a lower resolution, or any other reduced data set. In this way, the amount of data needed to represent the full LF may be reduced significantly (e.g., by multiple orders of magnitude), creating a viable path to enabling the transmission of truly holographic datasets. Such techniques can provide high image quality while balancing data set size for efficient sharing of data providing advantages including, for example, reduced storage requirements, enabling data to be streamed live over a network, etc.

In some embodiments, the data is encoded by a proprietary encoding block. This encoding process is part of a proprietary encoding/decoding pair. The receiving system or systems include a matching decoding block. These encoding and decoding blocks can be licensed by third party vendors. The encoding block can compress the vectorized format while balancing image quality with transmission speed, and automatically adjust to network speeds, e.g., to provide the highest possible image quality for the available bandwidth. The encoding process may use selectable or variable compression ratios which may include real-time or off-line image processing, other computations, and/or reducing the data to a sparser data set.

The encoded data is sent with a steaming engine through a network interface (e.g., network interface 524, in the case where the LF capture system is integrated with a LF display system 500) from the LF capture system to one or more LF display systems 500 (e.g., located in the physical location or locations of the other participant or participants). The encoded data is received by a LF display system 500, decoded (e.g., by the proprietary decoder). The decoder processes the encoded signal, and combined with the display drivers and display hardware configuration, allows the LF processing engine 530 to agnostically project the available information as a fully rasterized 4D light field, taking into account the resolution of the LF display assembly 510 as well as the available haptic interfaces and other sensory projection capabilities of the LF display system 500.

As described previously, the encoded data sent over the network is in a vectorized format. The LF processing engine 530 takes this data and converts it into a rasterized format that drives the LF display assembly 510. The rasterized format may be many orders of magnitude larger than the vectorized data set. In some embodiments, both holographic video conferencing information and CG content is sent.

In some embodiments, the encoded data also includes matching haptic surface instructions for some or all of the holographic objects. In one embodiment, the vectorized format produced from the light field display assembly 510 includes vectorized properties that provide accurate physics for multiple sensory domains for which properties may be synthetically programmed, captured, or computationally assessed, including, for example, any of: N red/green/blue/alpha channel (RGBA)+depth images, N multi view images with or without depth at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, game audio, and any other sensory domain property. The vectorization of data may eliminate multiple orders of magnitude of required data, creating a viable path to enabling the transmission of datasets including properties in multiple sensory domains.

The LF processing engine 500 may also modify holographic content to suit the space in which the holographic content is being presented. For example, not every conference room is the same size, has the same number of seats, or has the same technical configuration. As such, LF processing engine 530 may modify holographic content such that it will be appropriately displayed in a conference room. In one embodiment, the LF processing engine 530 may access a configuration file of a conference room including the layout, resolution, field-of-view, other technical specifications, etc. of the conference room. The LF processing engine 530 may render and present the holographic content based on information included in the configuration file.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 can use information from the tracking system 580, the sensory feedback system 570, the viewer profiling module 528, the tracking module 526, or some combination thereof, to create holographic content for display. In some examples, LF processing engine 530 may access information from elements of the LF display system 500 (e.g., tracking information and/or a viewer profile), create holographic content based on that information, and display the created holographic content using the LF display system 500 in response. The created holographic content may be augmented with other sensory content (e.g., touch, audio, or smell) when displayed by the LF display system 500.

Dynamic Content Generation for a LF Display System

In some embodiments, the LF processing engine 530 incorporates an artificial intelligence (A) model to create holographic content for display by the LF display system 500. The AI model may include supervised or unsupervised learning algorithms including but not limited to regression models, neural networks, classifiers, or any other AI algorithm. The AI model may be used to determine viewer preferences based on viewer information recorded by the LF display system 500 (e.g., by tracking system 580) which may include information on a viewer's behavior.

The AI model may access information from the data store 522 to create holographic content. For example, the AI model may access viewer information from a viewer profile or profiles in the data store 522 or may receive viewer information from the various components of the LF display system 500. To illustrate, the AI model may determine one viewer prefers seeing financial data in a chart while another prefers seeing it in a table. The AI model may determine the preference based on the viewers' reactions or responses to previously viewed holographic content including financial data (e.g., Did the viewer ask for clarification? Did the user ask to see the data in a different format? Etc.). The LF display system 500 may then present the same data to different users using different types of holographic representation. That is, the AI model may create holographic content personalized to a set of viewers according to the learned preferences of those viewers. So, for example, the AI model may create a holographic chart of financial data for one user and a holographic table of the same data for another. The AI model may also store the learned preferences of each viewer in the viewer profile store of the data store 522. In some examples, the AI model may create holographic content tailored to a group of viewers rather than a single viewer.

One example of an AI model that can be used to identify characteristics of viewers, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. For example, and AI model may include five layers of nodes: layers A, B, C, D, and E. The transformation from layer A to layer B is given by a function $W_1$, the transformation from layer B to layer C is given by $W_2$, the transformation from layer C to layer D is given by $W_1$, and the transformation from layer D to layer E is given by $W_4$. In some examples, the transformation can also be determined through a set of weights and parameters used to transform between previous layers in the model. For example, the transformation $W_4$ from layer D to layer E can be based on parameters used to accomplish the transformation $W_1$ from layer A to B.

The input to the model can be an image taken by tracking system 580 encoded onto the convolutional layer A and the output of the model is holographic content decoded from the output layer E. Alternatively or additionally, the output may be a determined characteristic of a viewer in the image. In this example, the AI model identifies latent information in the image representing viewer characteristics in the identification layer C. The AI model reduces the dimensionality of the convolutional layer A to that of the identification layer C to identify any characteristics, actions, responses, etc. in the image. In some examples, the AI model then increases the dimensionality of the identification layer C to generate holographic content.

The image from the tracking system 580 is encoded to a convolutional layer A. Images input in the convolutional layer A can be related to various characteristics and/or reaction information, etc. in the identification layer C. Relevance information between these elements can be retrieved by applying a set of transformations between the corresponding layers. That is, a convolutional layer A of an AI model represents an encoded image, and identification layer C of the model represents a smiling viewer. Smiling viewers in a given image may be identified by applying the transformations $W_1$ and $W_2$ to the pixel values of the image in the space of convolutional layer A. The weights and parameters for the transformations may indicate relationships between information contained in the image and the identification of a smiling viewer. For example, the weights and parameters can be a quantization of shapes, colors, sizes, etc. included in information representing a smiling viewer in an image. The weights and parameters may be based on historical data (e.g., previously tracked viewers).

Smiling viewers in the image are identified in the identification layer C. The identification layer C represents identified smiling viewers based on the latent information about smiling viewers in the image.

Identified smiling viewers in an image can be used to generate holographic content. To generate holographic content, the AI model starts at the identification layer C and applies the transformations $W_2$ and $W_3$ to the value of the given identified smiling viewers in the identification layer C. The transformations result in a set of nodes in the output layer E. The weights and parameters for the transformations may indicate relationships between an identified smiling viewers and specific holographic content and/or preferences. In some cases, the holographic content is directly output from the nodes of the output layer E, while in other cases the content generation system decodes the nodes of the output layer E into a holographic content. For example, if the output is a set of identified characteristics, the LF processing engine can use the characteristics to generate holographic content.

Additionally, the AI model can include layers known as intermediate layers. Intermediate layers are those that do not correspond to an image, identifying characteristics/reactions, etc., or generating holographic content. For example, in the given example, layer B is an intermediate layer between the convolutional layer A and the identification layer C. Layer D is an intermediate layer between the identification layer C and the output layer E. Hidden layers are latent representations of different aspects of identification that are not observed in the data, but may govern the relationships between the elements of an image when identifying characteristics and generating holographic content. For example, a node in the hidden layer may have strong connections (e.g., large weight values) to input values and identification values that share the commonality of "laughing people smile." As another example, another node in the hidden layer may have strong connections to input values and identification values that share the commonality of "scared people scream." Of course, any number of linkages are present in a neural network. Additionally, each intermediate layer is a combination of functions such as, for example, residual blocks, convolutional layers, pooling operations, skip connections, concatenations, etc. Any number of intermediate layers B can function to reduce the convolutional layer to the identification layer and any number of intermediate layers D can function to increase the identification layer to the output layer.

In one embodiment, the AI model includes deterministic methods that have been trained with reinforcement learning (thereby creating a reinforcement learning model). The model is trained to increase the quality of the performance using measurements from tracking system 580 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told which actions to take (e.g., generating prescribed holographic content), but instead discovers which actions yield the most reward (e.g., increasing the quality of holographic content by making more people cheer) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of generating a song for a performer, the reinforcement learning system captures information about viewers in the venue (e.g., age, disposition, etc.). Such an agent senses the state of the environment and takes actions that affect the state to achieve a goal or goals (e.g., creating a pop song for which the viewers will cheer). In its most basic form, the formulation of reinforcement learning includes three aspects for the learner: sensation, action, and goal. Continuing with the song example, the LF processing engine 530 senses the state of the environment with sensors of the tracking system 580, displays holographic content to the viewers in the environment, and achieves a goal that is a measure of the viewer's reception of that song.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate of its expected reward. For example, if the LF processing engine creates holographic content that the LF processing engine knows will result in a viewer laughing after a long period of time, the LF processing engine may change the holographic content such that the time until a viewer laughs decreases.

Further, reinforcement learning considers the whole problem of a goal-directed agent interacting with an uncertain environment. Reinforcement learning agents have explicit goals, can sense aspects of their environments, and can choose actions to receive high rewards (i.e., a roaring crowd). Moreover, agents generally operate despite significant uncertainty about the environment they face. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed and actions are carried out to achieve a goal. The learner and decision-maker is called the agent (e.g., LF processing engine 530). The thing it interacts with, comprising everything outside the agent, is called the environment (e.g., viewers in a venue, etc.). These two interact continually, the agent selecting actions (e.g., creating holographic content) and the environment responding to those actions and presenting new situations to the agent. The environment also gives rise to rewards, special numerical values that the agent tries to maximize over time. In one context, the rewards act to maximize viewer positive reactions to holographic content. A complete specification of an environment defines a task which is one instance of the reinforcement learning problem.

To provide more context, an agent (e.g., LF processing engine 530) and environment interact at each of a sequence of discrete time steps, i.e. t=0, 1, 2, 3, etc. At each time step t the agent receives some representation of the environment's state $s_t$ (e.g., measurements from tracking system 580). The states $s_t$ are within S, where S is the set of possible states. Based on the state stand the time step t, the agent selects an action at (e.g., making the performer do the splits). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$ where $\pi_t(s,a)$ is the probability that $a_t=a$ if $s_t=s$. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. generating holographic content). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Of course, the AI model can include any number of machine learning algorithms. Some other AI models that can be employed are linear and/or logistic regression, classification and regression trees, k-means clustering, vector quantization, etc. Whatever the case, generally, the LF processing engine 530 takes an input from the tracking module 526 and/or viewer profiling module 528 and a machine learning model creates holographic content in response. Similarly, the AI model may direct the rendering of holographic content.

In some embodiments, the LF processing engine 530 generates display instructions for presentation of holographic assistants to a participant in video conference. Such an assistant may provide a participant with information pertinent to the video conference, assist with presentations, and the like. The LF processing engine 530 may retrieve the holographic assistants stored as holographic objects in a data store. Each holographic assistant may have various parameters that dictate presentation of the holographic assistant. For example, the holographic assistant may have parameters that include but are not limited to a type of assistant (e.g., human avatar, alien, robot, humanoid, etc.), a size of the assistant, a gender of the assistant when available, a voice of the assistant, a personality of the assistant, or any combination thereof.

In additional embodiments, the LF processing engine 530 further accesses a viewer profile that may have preferences of a participant for an assistant. For example, the viewer profile may include preferences (e.g., provided by the participant or inferred by the viewer profiling module 528) that a participant prefers to have an assistant as a male human with brown hair and a deep voice, a female alien with black hair and a high-pitched voice, etc. Additionally, the LF processing engine 530 may incorporate an AI model, as described above, to generate instructions for presentation of the assistant so as to present a holographic assistant that engages with the participant. The AI model may be used to constantly generate instructions for the sensory feedback system 570 to provide audio feedback to respond to voice input from the participant, i.e., simulating a real time dialog between the participant and the holographic assistant. Furthermore, the LF processing engine 530 may use tracking information from the tracking system 580 and/or the tracking module 526 to generate display instructions for the LF display assembly 510 to adjust presentation of the holographic assistant's eyes to move or track with the participant's gaze or body movement.

The preceding examples of creating content are not limiting. Most broadly, LF processing engine 530 creates holographic content for display to viewers of a LF display system 500. The holographic content can be created based on any of the information included in the LF display system 500.

Light Field Display Video Conferencing System

Figure 6:
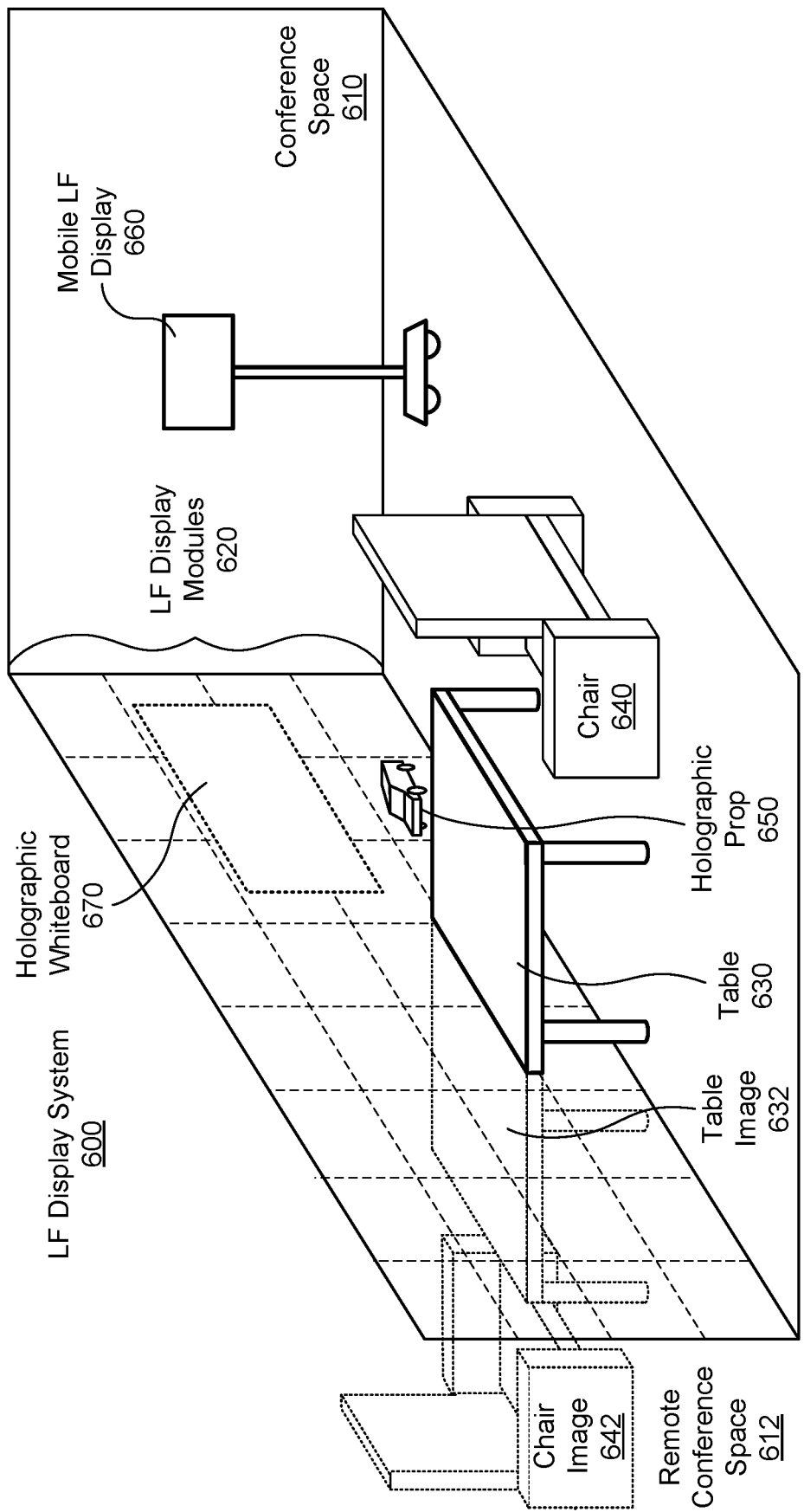
FIG. 6 is an illustration of an example light field display system for video conferencing, in accordance with one or more embodiments.

FIG. 6 is an illustration of a LF display system 600 for video conferencing, in accordance with one or more embodiments. The LF display system 600 is an embodiment of the LF display system 500. The LF display system 600 is located in a conference space 610. The conference space 610 is typically a room including a LF display formed by LF display modules 620 of a LF display assembly 510. In the configuration shown in FIG. 6, the LF display modules 620 are set up covering one wall of a video conferencing room. However, the conference space 610 may be any physical space in which the LF display modules 620 may be temporarily or permanently installed. In one embodiment, the LF display system 600 has an imaging system that is integrated into the LF display assembly 510. Thus, the LF display assembly 510 may act as a bidirectional display surface that both projects light fields and relays light from the display surface to at least one imaging sensor. The LF display system may additionally or alternatively have cameras external to the display, with the images analyzed using tracking software in a controller 520 for the light field display assembly 510.

In FIG. 6, the conference space 610 also includes a table 630 and a chair 640. The table 640 is positioned against the wall with the LF display modules 620 and the chair 640 is positioned for a participant to sit at the table 630. The LF display modules 620 are generating holographic images of a table 632 and chair 642 that are located in a different physical space 612 in which another video conference participant is located. The holographic images may be generated based on visual data collected by a remote light field display assembly (e.g., one or more remote LF display modules) located in a remote conference space 612. For example, in one embodiment, each conference space includes an LF display system 600 that has an imaging system integrated into a LF display assembly 510. Thus, each display assembly 510 acts as a bidirectional surface, which may be configured to give the impression that the two conference spaces are physically adjacent to each other with the LF display assemblies 510 serving as a window between them.

The visual data used to generate holographic images may be a digital representation of light detected by one or more imaging sensors (e.g., imaging sensors of one or more LF display modules 620). For example, in the case of the chair 642, the visual data may be light that was reflected from the chair and detected by the LF display modules 620 of an LF display system 600 in the remote conference space 612. Alternatively or additionally, the remote light field display assembly 510 may collect visual data using other sensors, such as stand-alone cameras, etc. In some embodiments, the visual data may be vectorized and/or compressed as described previously, with regard to FIG. 5.

The holographic table 632 is abutting the physical table 630. Thus, it appears to a participant in the conference space 610 (e.g., sitting in the chair 640) that the physical chair 640 and the image of the chair 642 in the other physical location 612 are around a single table (made up of the physical table 630 and the image of the table 632 in the other location). Similarly, in the other physical location 612, a holographic table 632 is presented abutting the physical instance of table 630 along with a holographic chair 642. Although FIG. 6 shows two identical tables being used to improve the illusion that they are two halves of a single table, different sizes and shapes of table may be used.

When participants sit in the chairs 640, 642 (or otherwise position themselves in the respective viewing volumes), holograms of the participants may be provided in the other physical location. For example, a hologram of a first user sitting in chair 640 may be provided in the second conference space 612 and a hologram of a second participant sitting in chair 642 may be provided in the first conference space 610. Although each physical location is described as having a single chair and participant, it should be appreciated that either or both locations may include multiple participants. It should also be appreciated that in some embodiments, there may be more than two physical locations.

In one embodiment, the remote conference space 612 contains no LF display system, but is photographed with a LF camera, and the images are sent to the LF display system 600 in conference space 610. In other embodiments, both the remote conference space 612 and the local conference space 610 contain LF display systems 600 as well as light field capture devices. In another embodiment, holographic data is captured in either space using one or more traditional 2D cameras along with a depth sensor. In still another embodiment, 2D image data is captured with one or more 2D cameras in either the remote or local conference space, and holographic data is generated from the 2D image data using 2D to 3D conversion techniques known in the art. In one embodiment, the LF display modules 620 include bidirectional surfaces that project a light field and simultaneously absorb incident light, relaying it to one or more image sensors, which may be used to record a light field from the area near the display surface. In the configuration where there is a light field display system 600 with such bidirectional surfaces located at both locations involved in the video conference, then there may be a one-to-one correspondence between the gaze direction for participants in the physical locations connected by the video conferencing solution because the LF display modules 620 are acting as a co-located display and camera. Thus, the participants may make eye contact as if they were located within the same physical space. In other words, the LF display modules 620 act as a window between the two locations, giving the impression that the participants are sitting around a single table.

The LF display modules 620 may also include an audible sound field projection system. This may emanate from electrostatic speakers that are mounted onto the surface of the display, with optically transparent membranes, at locations between waveguide elements, co-located with or helping form structures designed to inhibit light transmission between waveguides, to allow both sound fields and light fields to be simultaneously projected from the display surface. The sound detected by microphones in one physical location may be emitted by corresponding LF display modules 620 in the other physical location. Thus, when a participant in one physical location speaks or otherwise makes a sound, it may seem in another physical location as if the sound is coming from the hologram of the participant. Alternatively, separate microphones and speakers may be used to establish an audio connection between the physical locations.

In some embodiments, a haptic projection system is integrated into the display surface formed by the LF display modules 620. Thus, the display surface may be a dual energy surface that projects both light fields and focused ultrasound energy to create tactile surfaces. This may enable participants in a video conference to experience the sensation of making physical contact with remote participants, such as shaking hands. It may also be used to generate holographic objects that participants may touch and manipulate (e.g., holographic prop 650, which is described in greater detail below).

In some embodiments, the display surface includes speakers (e.g., electrostatic speakers) for generating audio fields. Thus, the system may control the direction from which participants hear sound. For example, the controller 520 of an LF display system 600 may use tracking software to determine which remote participant is speaking and cause the speaker to emit an audio field that substantially co-locates the apparent source of the generated audio and the holographic representation of the participant who is speaking. This can further increase the impression that the participants are all located in the same physical space. Additionally or alternatively, the LF system 600 may include one or more speakers that are outside of the display.

In the embodiment shown in FIG. 6, the conference space 610 also includes a mobile LF system 660. The mobile LF system 660 may have a display surface area that is smaller than the display surface area of one or more other LF displays, such as the surface formed with LF modules 620. Although the mobile LF system 660 is shown as a robot on wheels, other forms of locomotion may be used. For example, the mobile LF system 660 may be mounted on tracks, mounted on an articulated robot arm, or be carried by a human participant. Regardless of the precise form adopted, the mobile LF system 660 may provide functionality to further increase the impression than participants from different physical locations are present within the same space.

In various embodiments, the mobile LF system 660 may include an image capture system, an image display system, or both. The image capture system of a mobile LF system 660 may include one or more 2D cameras, a depth sensor, and/or a LF camera. Thus, a mobile LF system 660 may be configured to capture 2D image data and or holographic data for an area near the mobile LF system 660 (e.g., in front of the mobile LF system). The mobile LF system 660 may also, in configurations that capture 2D image data, convert 2D image data into holographic data (e.g., using depth sensor data and/or 2D to 3D techniques known in the art). The mobile LF system 660 may also be configured to capture other types of data. For example, the mobile LF system 660 may include a microphone configured to capture audio data.

The image display system of a mobile LF system 660 may include a 2D display, a LF display system, or both. In some embodiments, a mobile LF system 660 includes a bidirectional surface that may be configured to simultaneously capture LF image data and project holographic content.

In one embodiment, the mobile LF system 660 is located in one space (e.g., the local conference space 610) but controlled by a participant located in a remote location (e.g., remote conference space 612). Thus, the controlling participant can navigate the mobile LF system 660 around the conference space 610 to see perspectives that may not otherwise be available (e.g., the back of chair 640). Furthermore, the mobile LF display 660 may create a holographic image of some (e.g., head and shoulders) or all of the controlling participant (or an avatar of the controlling participant). Consequently, the controlling participant may explore the conference space 610 and other participants who are physically located within the conference space 610 may interact with the holographic image of the controlling participant as if they were physically present. This may further increase the impression that the participants are located within a common physical space.

The LF display system 600 may also present supplemental holographic content in the conference space 610. The embodiment shown in FIG. 6 includes two examples of supplemental holographic content: a holographic prop 650 (in this case, a holographic image of a car) and a holographic whiteboard 670. The holographic prop 650 and the holographic whiteboard 670 may be displayed in both the local and remote conference spaces, or just one of these spaces. In other embodiments, different and/or additional supplemental holographic content may be presented by the LF display system.

The holographic prop 650 is a holographic object such as a 3D CAD model. The holographic prop 650 may be an image of a physical object (e.g., a product prototype located in the second conference space 612) or a CG virtual object (e.g., generated from a file on a computer, such as the controller 520). This may further enable participants in different physical locations to interact as if they are in the same space. For example, a participant in the second conference space 612 may select a 3D CAD model and the LF display system 600 generates the holographic prop 650 in a holographic viewing volume in the first conference space 610. The location of the holographic viewing volume may be selected based on the preferences of one or more participants located in the conference space 610. Alternatively, the holographic prop 650 may appear at a default location.

In some embodiments, ultrasound is used to provide a tactile surface for the holographic prop 650, as described previously. The tracking system 580 of the LF display system 600 may track the motion of participants in the conference space 610 to enable manipulation of the holographic prop. For example, a participant may be able to reach out and "grab" the holographic prop 650 to rotate and/or move it. The tracking system 580 may also recognize certain gestures as commands relating to the holographic prop 650. For example, if a participant places both hands on (or near) the holographic prop 650 and moves their hands apart or together, the tracking system 580 may interpret these gestures as commands to increase and decrease the size of the holographic prop 650, respectively.

If both conference space 610, 612 include a LF display system 600, a shared instance of the holographic prop 650 may be formed in each conference space. Thus, interactions with the holographic prop 650 by a participant in one space can be reflected in the presentation of the holographic prop 650 in the other space. For example, if the holographic prop 650 is generated from a 3D CAD model, a participant in one space might rotate the model to make a particular feature visible while describing that feature as part of a presentation. The holographic prop 650 in the other space may be automatically rotated in the same way enabling all participants to see the feature being described. In some embodiments, a participant may annotate the holographic prop 650 using a stylus (or other such tool). The tracking system 580 may track the motion of the stylus and add the annotations to a file from which the holographic handout was generated and/or display holographic versions of the annotations in conjunction with the holographic prop 650. Returning to the previous example, the presenter might draw a circle around the feature being described, provide written annotations providing additional information about the features, add an arrow indicating how the feature moves in operation, or the like.

The holographic whiteboard 670 provides an interface for participants to draw on, similar to a physical whiteboard. In some embodiments, the LF display system 600 provides a holographic image indicating the extent of the holographic whiteboard 670 (e.g., a holographic image of a physical whiteboard) in each conference space 610, 612. For example, in the configuration shown in FIG. 6, each conference space 610, 612 may include a holographic whiteboard 670 next to a physical table 630, 632. The holographic whiteboards 670 in each location are synchronized, meaning any additions or modifications made on one appear on the others. Thus, participants in different physical locations may collaborate on the holographic whiteboard 670 as if they were present in the same physical space. Ultrasound may be used to create a tactile surface for some or all of the holographic whiteboard 670 to gives participants the sensation of drawing on a physical whiteboard (or some other surface, such as paper, a chalkboard, canvas, etc.).

In one embodiment, the contributions of different participants are stored as different layers. A participant may select which layers are displayed on the holographic whiteboard 670 (e.g., using a physical remote control and/or holographic controls). The layer selection may be synchronized across instances of the holographic whiteboard 670. Alternatively, participants in each location may independently select which layers to display. In other embodiments, layers may be added, used, and displayed in different ways. For example, participants may be provided with controls (e.g., physical or holographic) to add and delete layers as well as select which layer is currently active. New content may be added to the currently active layer. The controls may also enable participants to split layers and move content between layers. Thus, participants may control what content on the holographic whiteboard 670 is in what layer.

In some embodiments, the holographic whiteboard 670 is 3D. Because the whiteboard is holographic, it need not be limited to a 2D surface. Participants may draw lines that move forwards/backwards as well as up/down and/or left/right. This may enable participants to directly draw 3D structures and more easily express complex concepts and relationships than is possible when limited to 2D representations. In one embodiment, a 3D whiteboard is divided into slices along the forwards/backwards axis. Participants may select which slices are displayed to view different cross sections of depicted 3D structures.

In some embodiments, the holographic whiteboard 670 may be used to display 3D holographic objects such as CAD models, building schematics, park plans, etc. The 3D objects may be generated from a data file or by imaging a physical object (e.g., a product prototype, set of blueprints, etc.) located within one of the conference spaces (e.g., remote conference space 612). In one example, each page of a document may be presented as a different layer on the holographic whiteboard 670. Participants may select which layers to view to read specific pages. Participants may also move pages around within the 3D volume of the holographic whiteboard independently. Thus, a participant may view any combination of pages (e.g., side by side). Similarly, a participant could arrange corresponding pages of two different versions of a document to enable easy comparison. As another example, the LF processing engine 530 might take a set of blueprints for a building and use them to create an approximate 3D model of the building. Participants may then interact with the holographic whiteboard 670 to, for example, view different cross sections of the building, remove certain elements (e.g., wiring, doors, specific walls, etc.) from the displayed model, make modifications to the model (which may then be used to generate updated blueprints), add annotations, etc.

The LF display system 600 may modify the images of participants and/or other holographic objects. In one embodiment, to improve the impression that holographic objects are located within the conference space 610, the LF display system 600 determines lighting parameters (e.g., the overall brightness and spectral distribution) within the conference space 610 and adjusts the holographic images to better match the lighting parameters. For example, if the conference space 610 has a bright light on the left-hand side, the holographic images might be adjusted such that the left side is brighter while the right side is in shadow. This may increase the impression that the images are physical objects that are located within the conference space 610.

The LF display system 600 may also make adjustments to audio parameters for generated audible sound to account for acoustic effects within the conference space 610. For example, if one corner typically has muffled sound, the LF display system may apply an equalization boost to a high frequency band of the acoustic energy directed towards that corner to provide clearer sound. The LF display system may also provide noise cancelling. For example, one or more LF display modules 620 at the back of the conference space 610 may emit sound waves that partially or completely cancel soundwaves emitted from the LF display modules 620 at the front of the conference space 610.

Light Field Display Video Chat System

Figure 7:
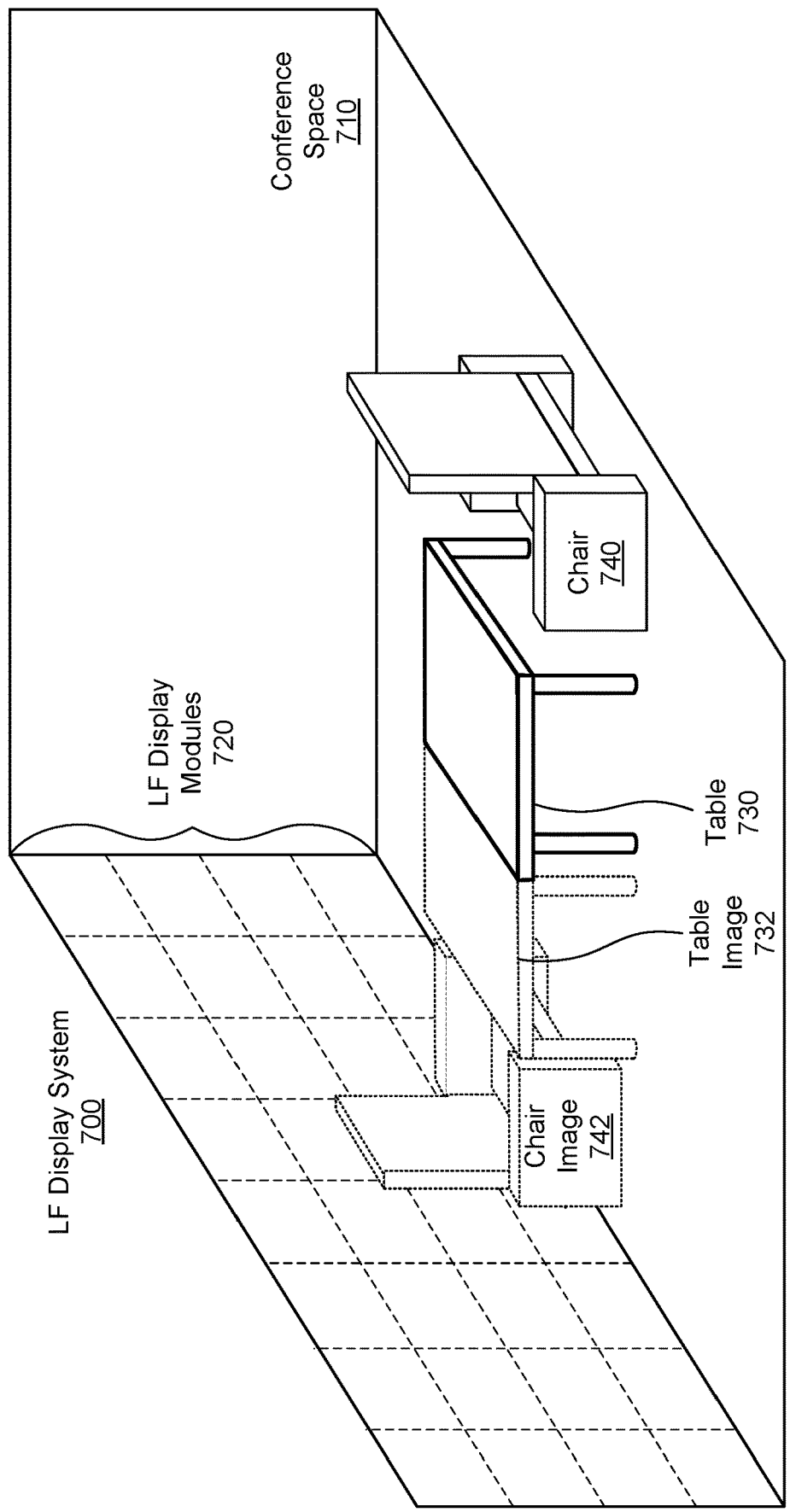
FIG. 7 is an illustration of an alternative configuration of a video conferencing space, in accordance with one or more embodiments.

FIG. 7 shows an alternative configuration for a conference space 710 including a LF display system 700, in accordance with one or more embodiments. The LF display system 700 is an embodiment of the LF display system 500. In FIG. 7, rather than generating holographic images of a table and chair located behind the display surface, an LF display system 700 generates holographic images of a table 730 and chair 742 in front of the display surface. Thus, the physical table 730 and chair 740 in the conference space 710 are not positioned against the LF display module 720 as they were in FIG. 6. To do this, the LF display system translates the holographic images by projecting them such that they appear in front of the LF display modules 720, rather than behind them (as they did in FIG. 6). Similarly, in the other physical location (where the table 732 and chair 742 are located), holographic images of the table 730 and chair 740 may be formed by translating those images by projecting them such that they too appear in front of the display surface of the other physical location.

Translating the images in this way may improve the impression that all of the holographic images (including participants) are located in the same physical space. Rather than the LF display modules 720 acting as a window through which participants can see but not pass, it is projecting images of the remote participants into the conference space 710. Thus, participants way walk up to and around each other. Furthermore, ultrasound tactile surfaces may be used to simulate participants in remote locations touching each other. Although not shown in FIG. 7, the conference space 710 may also include additional holographic objects, such as holographic handouts, whiteboards, and the like, as described above with reference to FIG. 6.

Figure 8A:
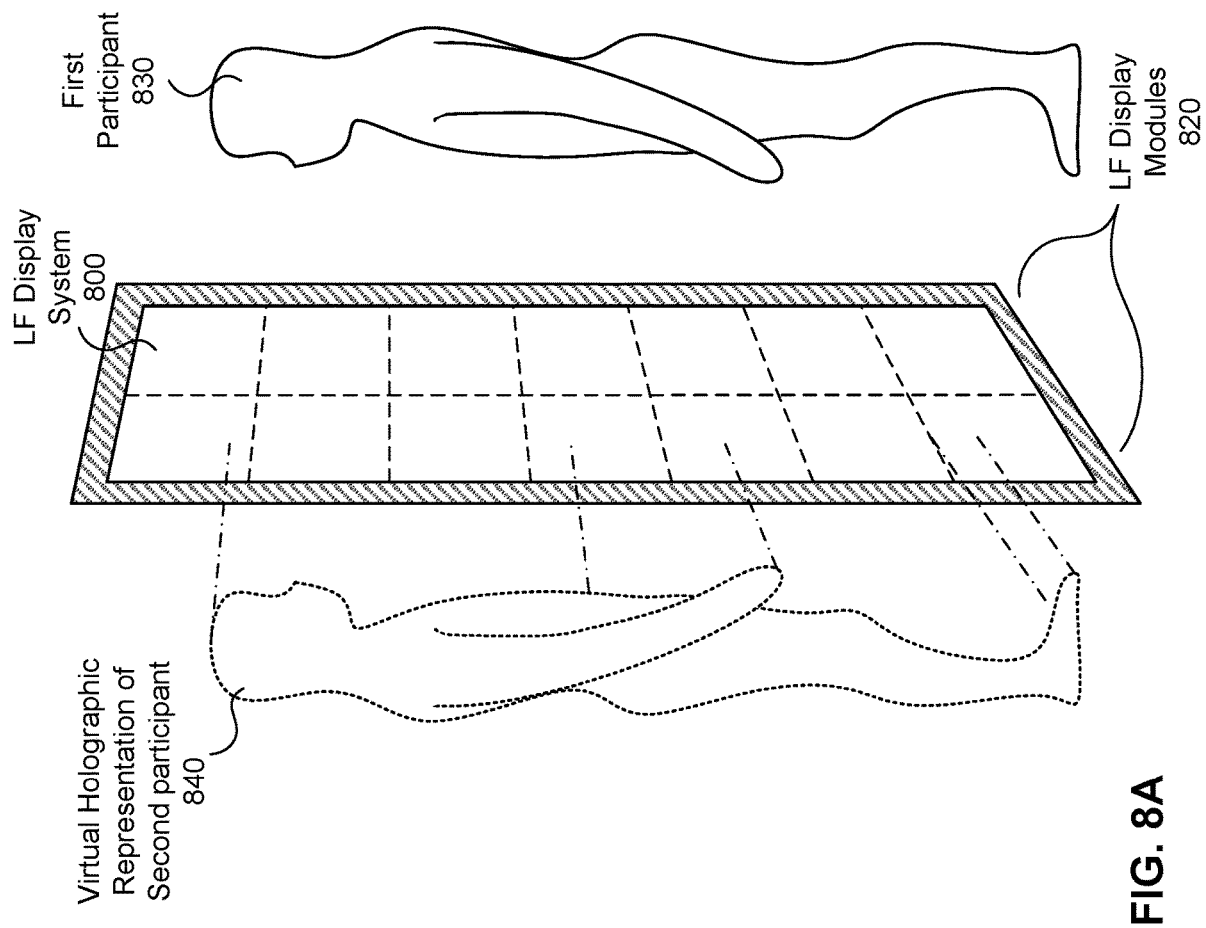
FIG. 8A is an illustration of a light field display system presenting holographic content including a holographic video chat participant, in accordance with one or more embodiments.

FIG. 8A is an illustration of a LF display system 800 presenting holographic content including a holographic video chat participant, in accordance with one or more embodiments. The LF display system 800 is an embodiment of the LF display system 500. The LF display system 800 has LF display modules 820 of a LF display assembly forming a one-sided seamless surface environment. The LF display system 800 provides video chat functionality in which a participant views holographic images of some or all of the other participants, generated by the LF display modules 820. The LF display system 800 may also include any combination of the other components of the LF display system 500 such as the sensory feedback assembly 570, the tracking system 580, the viewer profiling module 528, and the controller 520. In other embodiments, the LF display system 900 includes additional cameras separate from the tracking system for capturing image data.

In the illustration of FIG. 8A, a first video chat participant 830 in located within a viewing zone of the LF display system 800. The LF display system 800 captures image data of the first participant 830 via any combination of a tracking system (e.g., a tracking system 580), the LF display modules 820, one or more cameras included in the LF display system 800, and any additional tracking devices. In some instances, the LF display system 800 receives image data of the first participant 830 from multiple perspectives such as from one or more LF display modules 820 or from one or more cameras separate from or as part of the tracking system. In some embodiments, the LF display system 800 has cameras around the first participant 830 which capture image data encompassing perspectives over all 360°. Alternatively, the LF display system 800 may be "one way," meaning the first participant 830 is presented with a holographic representation of the second participant 840, but the LF display system 800 does not collect image data of the first participant 830 and/or does not provide such image data to the display device being used by the second participant 840.

The LF display system 800 produces holographic content that includes a holographic representation of a second video chat participant 840. The holographic representation of the second video chat participant 840 is a holographic image. In one embodiment, the LF display modules 820 are a bidirectional surface that also collect image data for the first participant 830 and send it to a LF display system of the second participant 840 for presentation as a holographic image. In other words, the LF display modules 820 may act as a window through which the participants may view each other. As with the video conferencing system described with reference to FIG. 6, there may be a one-to-one correspondence between gaze directions between participants, enabling those participants to make eye contact with each other as if they were located in the same physical space. Alternatively, the LF display system 800 may be "one way" with only one of the participants being presented with a holographic representation of the other.

Figure 8B:
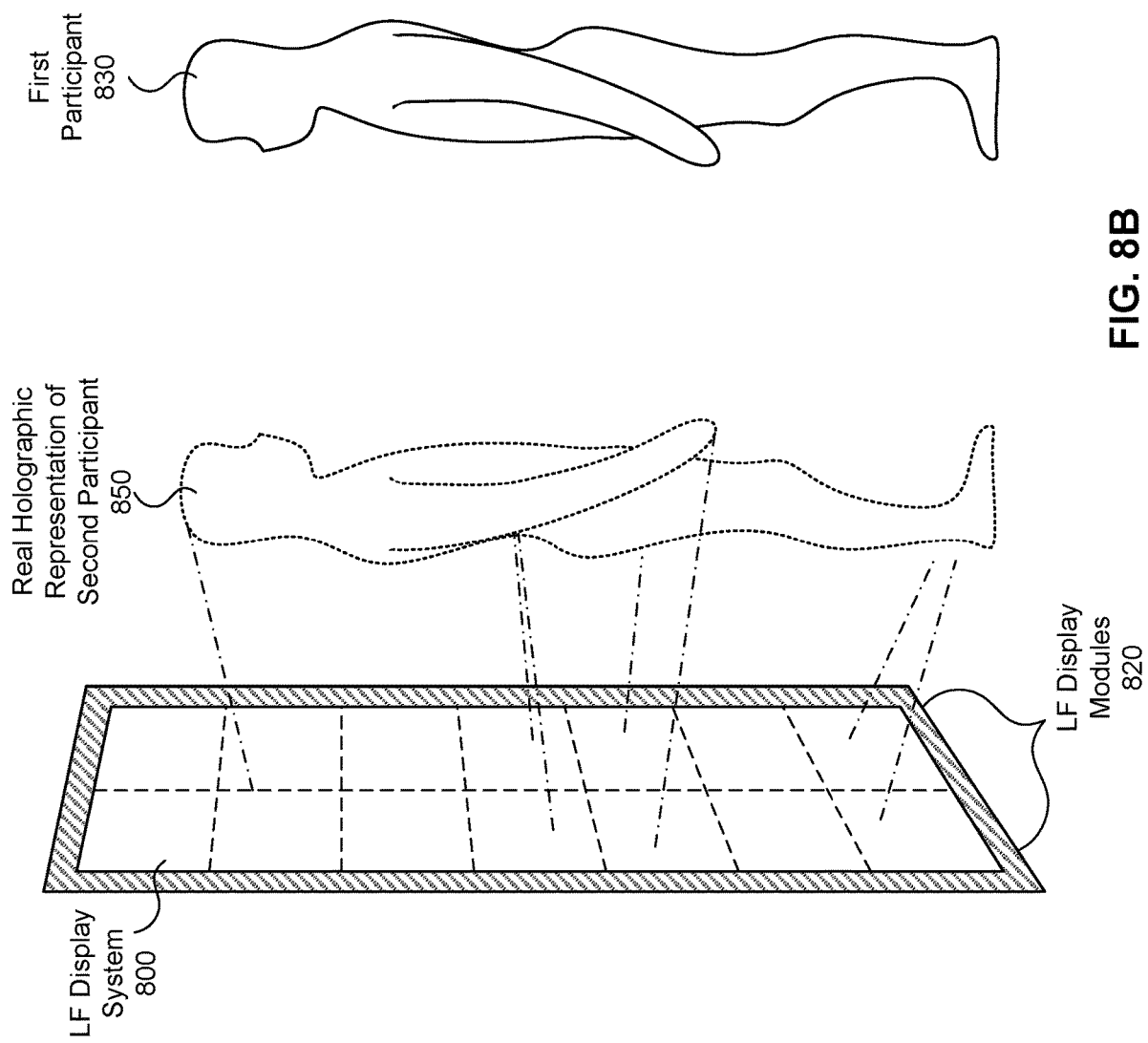
FIG. 8B is an illustration of the light field display system of FIG. 8A presenting holographic content including an image of the video chat participant, in accordance with one or more embodiments.

FIG. 8B is an illustration of the LF display system 800 of FIG. 8A presenting holographic content including a holographic image of the second video chat participant 850, in accordance with one or more embodiments. Similar to the video conferencing configuration illustrated in FIG. 7, the LF display system 800 is projecting the holographic image of the second participant 850 into the same physical space as the first participant 730. Thus, in contrast to the example shown in FIG. 8A, the first participant 830 experiences the impression that the second participant 850 is in the same physical location as them. The same or similar techniques as described previously for adjusting lighting and/or sound parameters to improve the overall experience may be applied. Furthermore, as described previously, an ultrasound projection system may be used to create volumetric haptic tactile surfaces for some or all of the holographic representations of the participants. These tactile surfaces may simulate the participants touching each other, further giving the impression that they are located within the same physical space. The ultrasound projection system may work in conjunction with the tracking system 580 to update the tactile surfaces. For example, using this approach, remote participants in a video chat may experience the sensation of shaking hands with each other, with the haptic tactile surfaces each participant experiences being updated based on the motion of the other participant's hand.

The LF display system 800 may also enable video chat participants to make changes to their appearance and/or voices. In one embodiment, the LF display system 800 provides controls (e.g., physical or holographic) enabling a participant to adjust parameters of the holographic representation of them presented to other participants. For example, participants may blur out their own faces, select a custom background, add balloons or other objects floating around them, make it appear like they are sitting behind a desk, or the like. Similarly, the LF display system 800 may enable participants to apply filters to alter their voices, such as increasing or decreasing pitch, making them sound like a robot, selectively reducing the intensity of certain frequencies, or the like.

In other embodiments, the LF display system 800 provides controls (e.g., physical or holographic) enabling the participants to apply filters to change aspects of their own or other participants' appearances. For example, a filter may change a participant's clothing, change a participant's hair color, replace a participant's image with an avatar mapped to that participant's movements, and/or apply any other visual filter to how a participant appears. In one embodiment, the filters are modular and participants may install (e.g., by downloading from a webstore, etc.) those that they wish to use. In some instances, additional filters may be made available by third parties. Such third-party filters may be free and/or made available for a price (e.g., through a marketplace).

Figure 9:
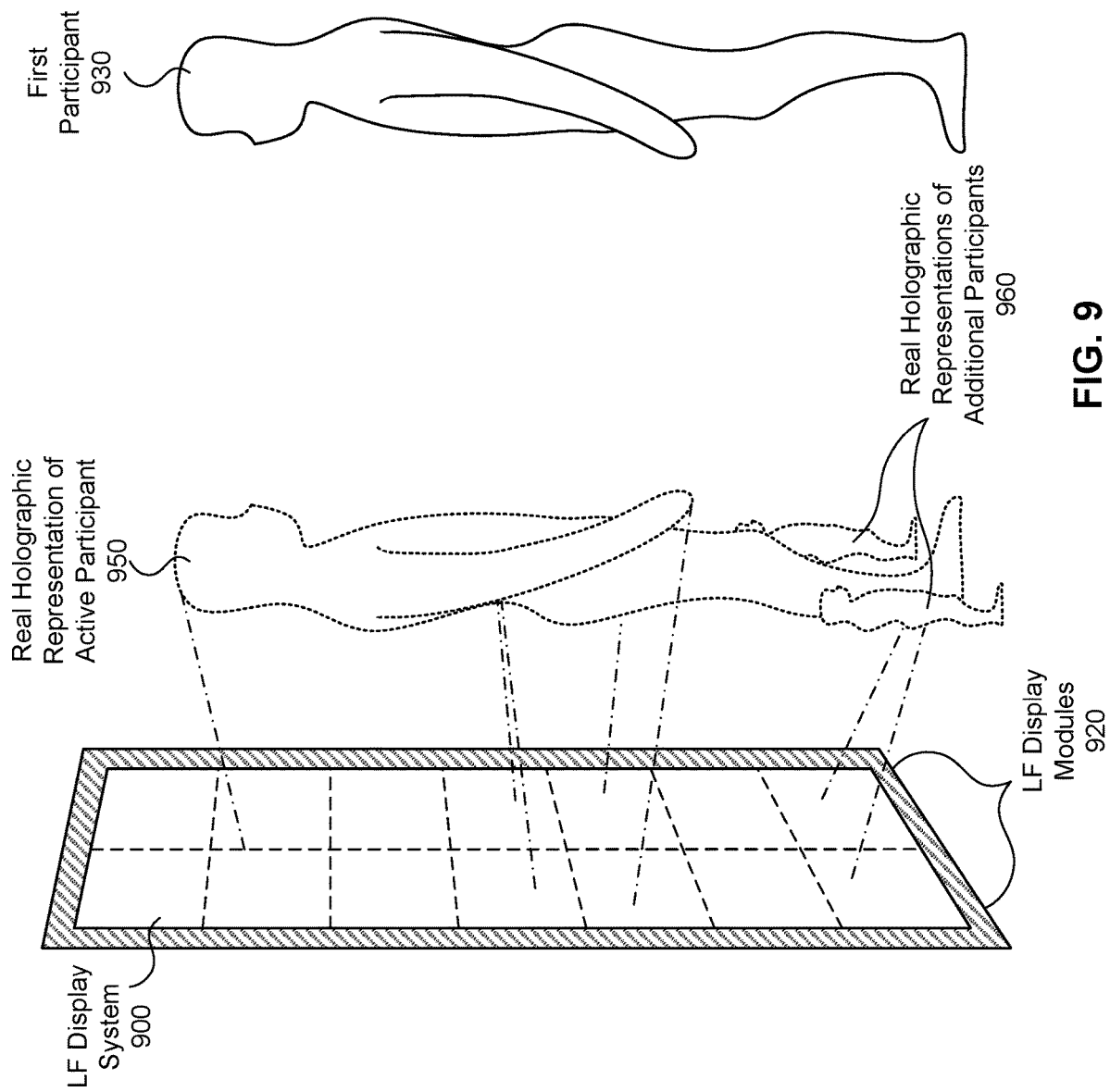
FIG. 9 is an illustration of a LF display system presenting holographic content including representations of participants in a group video chat, in accordance with one or more embodiments.

FIG. 9 is an illustration of a LF display system 900 presenting holographic content including holographic representations of participants in a group video chat, in accordance with one or more embodiments. The LF display system 900 is an embodiment of the LF display system 500. A first video chat participant 930 is in the same physical location as the LF display system 900. The LF display system includes LF display modules 920 that are generating a holographic image representation of an active participant 950 in the voice chat. The LF display modules 920 are also generating holographic image representations of one or more additional participants 960. The representations may be images of the participants and/or avatars of the participants. In FIG. 9, two additional participants 960 are shown, but a voice chat can include any number of additional participants (including zero). Furthermore, although the representations of the additional participants 960 are shown as being reduced in size, in other embodiments, other indicators may be used for the active participant 950, such as displaying the representation of the active participant 950 in a particular location (e.g., centrally), displaying a particular visual indication in conjunction with the representation of the active participant 950 (e.g., a glowing above the representation of the participant's head, etc.), or any other suitable indicator. In some embodiments, not all participants are represented by holographic representations. For example, participants who do not have access to a LF camera (or who choose to not use it) may instead be represented by a static avatar.

The LF display system 900 may determine which participant is the active participant 950 using any suitable method. In one embodiment, the LF display system identifies a participant that is currently speaking as the active participant 950 based on the collected acoustic energy. In another embodiment, the first participant 930 may change the active participant 950 using controls provided by the LF display system 900 (e.g., by pointing at one of the holographic representations of the additional participants 960). Although FIG. 9 illustrates the holographic representations as standing, this need not be the case. For example, the representations of the participants might be presented as sitting around a holographic (or physical) table, with the active participant 950 being placed at the head of the table.

In various embodiments, an LF display system 500 provides a holographic voice mail function. This operates substantially as described above with reference to video chat, except that the LF display system 500 creates a message for later presentation by collecting audio and visual data corresponding to an individual and saving it (e.g., in the data store 530) rather than presenting it substantially in real time at another location. For example, the individual may use physical and/or holographic controls to begin, pause, and end recording and then select one or more individuals to receive the recorded message. At a later time, a recipient may use physical and/or holographic controls of a LF display system 500 (which may be a different or the same system than used to record the message) to trigger playback of the message. During playback, the LF display system 500 presents a holographic image of the individual who recorded the message along with the corresponding audio content. In some embodiments, the same or similar techniques described above for modifying an individual's appearance and/or voice may be used.

In one embodiment, the LF display system 500 provides controls to enable a recipient to control playback of the message, such as controls to begin, pause, fast-forward, rewind, and/or end playback. As the LF display system 500 creates holographic content from the visual data, the recipient may move around to view the visual content of the message from different perspectives. Alternatively, the controls may include controls for rotating, translating, zooming in and out, and the like so that the recipient may view different perspectives without moving. Thus, the recipient may play the message multiple times to view it from different perspectives.

In some embodiments, similar playback functionality may be provided for recordings of video conferences and/or video chat sessions. The LF display system may provide an option for a video communication session to be recorded. Participants (and anyone else given access to the recording) may then replay the recorded session to view the recorded scene from different perspectives.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations of LF display system are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field display system in a local physical space, the light field display system comprising:
a controller configured to generate display instructions based on visual data corresponding to a remote scene, the visual data received from a remote image capture system located in a remote physical space; and
a local light field display assembly located within a local physical space that includes a local participant, the light field assembly including a bidirectional surface configured to simultaneously capture image data corresponding to local physical space and project holographic content generated from the display instructions, the holographic content including a holographic video of the remote scene,
wherein the controller is further configured to send, to a remote image display system in the remote physical space, outgoing visual data derived from the captured image data;
wherein the remote image display system is operable to generate video content including the local participant based on the outgoing visual data.

2. The light field display system of claim 1, wherein the local light field display assembly comprises a plurality of light field display modules.

3. The light field display system of claim 2 wherein the plurality of light field display modules are tiled to form a seamless display surface.

4. The light field display system of claim 1, wherein the remote image capture system is a remote light field display system that includes a bidirectional surface that simultaneously captures light field image data corresponding to the remote scene and projects the video content including the local participant.

5. The light field display system of claim 1, wherein the holographic content further includes a holographic prop.

6. The light field display system of claim 5, wherein the holographic prop is a holographic image generated from a 3D model of an object.

7. The light field display system of claim 5, further comprising a tracking system configured to generate tracking data representing motion of the local participant, wherein the holographic prop is manipulated based on the tracking data.

8. The light field display system of claim 1, wherein the holographic content further includes a holographic whiteboard, wherein content on the holographic whiteboard is synchronized with a corresponding holographic whiteboard generated by a remote light field display assembly.

9. The light field display system of claim 1, wherein the display instructions are operable to further cause the local light field display assembly to emit energy to create a tactile surface.

10. The light field display system of claim 9, wherein the tactile surface is collocated with at least a portion of a holographic image.

11. The light field display system of claim 10, wherein the holographic image is a holographic image of a remote participant or a holographic prop.

12. The light field display system of claim 1, further comprising a mobile light field system located in the local physical space.

13. The light field display system of claim 12, wherein a remote participant located in the remote physical space controls motion of the mobile light field system within the local physical space.

14. The light field display system of claim 13, wherein the mobile light field system is configured to capture image data corresponding to an area near the mobile light field system and provide the captured image data to the remote image display system.

15. The light field display system of claim 12, wherein the mobile light field system includes a bidirectional surface configured to simultaneously capture light field image data and project holographic content.

16. The light field display system of claim 15, wherein image data captured by the mobile light field system is projected as holographic content to a remote participant.

17. The light field display system of claim 16, wherein a hologram of at least a portion of the remote participant is projected in the local physical space simultaneously with the holographic content being projected to the remote participant.

18. The light field display system of claim 1, wherein the holographic content includes a holographic image of a remote participant in the remote physical location and one or more holographic images of one or more additional remote participants located in one or more additional remote physical locations.

19. The light field display system of claim 1, wherein the visual data is vectorized and the light field display system further comprises a processing engine configured to convert the vectorized visual data into rasterized visual data, the display instructions being generated from the rasterized visual data.

20. The light field display system of claim 1, wherein the light field display system further comprises a local decoding block that matches a remote encoding block used to compress the visual data, the local decoding block configured to decompress the visual data.

21. The light field display system of claim 20, wherein the captured image data includes visual data corresponding to the local participant and the light field display system further comprises:
   a local encoding block configured to compress the visual data corresponding to the local participant; and
   a network interface configured to send the compressed visual data corresponding to the local participant to the remote image display system.

22. The light field display system of claim 1, wherein the controller is further configured to receive additional visual data that corresponds to a prerecorded holographic video and generate additional display instruction, the additional display instructions causing the local light field display assembly to generate the prerecorded holographic video responsive to user input provided by the local participant.

23. The light field display system of claim 22, wherein the light field display system further comprises controls configured to enable the local participant to change a perspective from which the prerecorded holographic video is viewed.

* * * * *